(12) United States Patent
Feig et al.

(10) Patent No.: US 12,317,403 B2
(45) Date of Patent: May 27, 2025

(54) BROADBAND SYMPATHETIC ELECTROMAGNETICALLY-INDUCED TRANSPARENCY (EIT) COOLING

(71) Applicant: Quantinuum LLC, Broomfield, CO (US)

(72) Inventors: Michael Feig, Denver, CO (US); Brian Estey, Louisville, CO (US); Christopher Gilbreth, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 506 days.

(21) Appl. No.: 17/812,035

(22) Filed: Jul. 12, 2022

(65) Prior Publication Data

US 2023/0049490 A1 Feb. 16, 2023

Related U.S. Application Data

(60) Provisional application No. 63/228,486, filed on Aug. 2, 2021.

(51) Int. Cl.
| | |
|---|---|
| *H05H 3/04* | (2006.01) |
| *G04F 5/14* | (2006.01) |
| *G06N 10/40* | (2022.01) |

(52) U.S. Cl.
CPC ............... *H05H 3/04* (2013.01); *G04F 5/145* (2013.01); *G06N 10/40* (2022.01)

(58) Field of Classification Search
CPC .......... H05H 3/04; G04F 5/145; G06N 10/40; F25B 23/003

(Continued)

(56) References Cited

U.S. PATENT DOCUMENTS

| 5,620,571 A | 4/1997 | Bahns et al. |
|---|---|---|
| 10,733,524 B1 | 8/2020 | Feig et al. |

(Continued)

FOREIGN PATENT DOCUMENTS

| CN | 101006459 A | 7/2007 |
|---|---|---|
| CN | 104036841 A | 9/2014 |

(Continued)

OTHER PUBLICATIONS

Decision to grant a European patent Mailed on Oct. 4, 2024 for EP Application No. 22187951, 2 page(s).

(Continued)

*Primary Examiner* — Jason L McCormack
(74) *Attorney, Agent, or Firm* — Alston & Bird LLP

(57) ABSTRACT

An atomic object confined in a particular region of an atomic object confinement apparatus is cooled using an S-to-P-to-D EIT cooling operation. A controller associated with the atomic object confinement apparatus controls first and second manipulation sources to respectively provide first and second manipulation signals to the particular region. The first manipulation signal is characterized by a first wavelength corresponding to a transition between an S manifold and a P manifold of a first component of the atomic object and detuned from the S-to-P transition by a first detuning. The second manipulation signal is characterized by a second wavelength corresponding to a transition between the P manifold and a D manifold of the first component and detuned from the P-to-D transition by a second detuning. The first and second detunings selected to establish a dark state associated with a two-photon transition between the S manifold and the D manifold.

20 Claims, 10 Drawing Sheets

Figure 1:
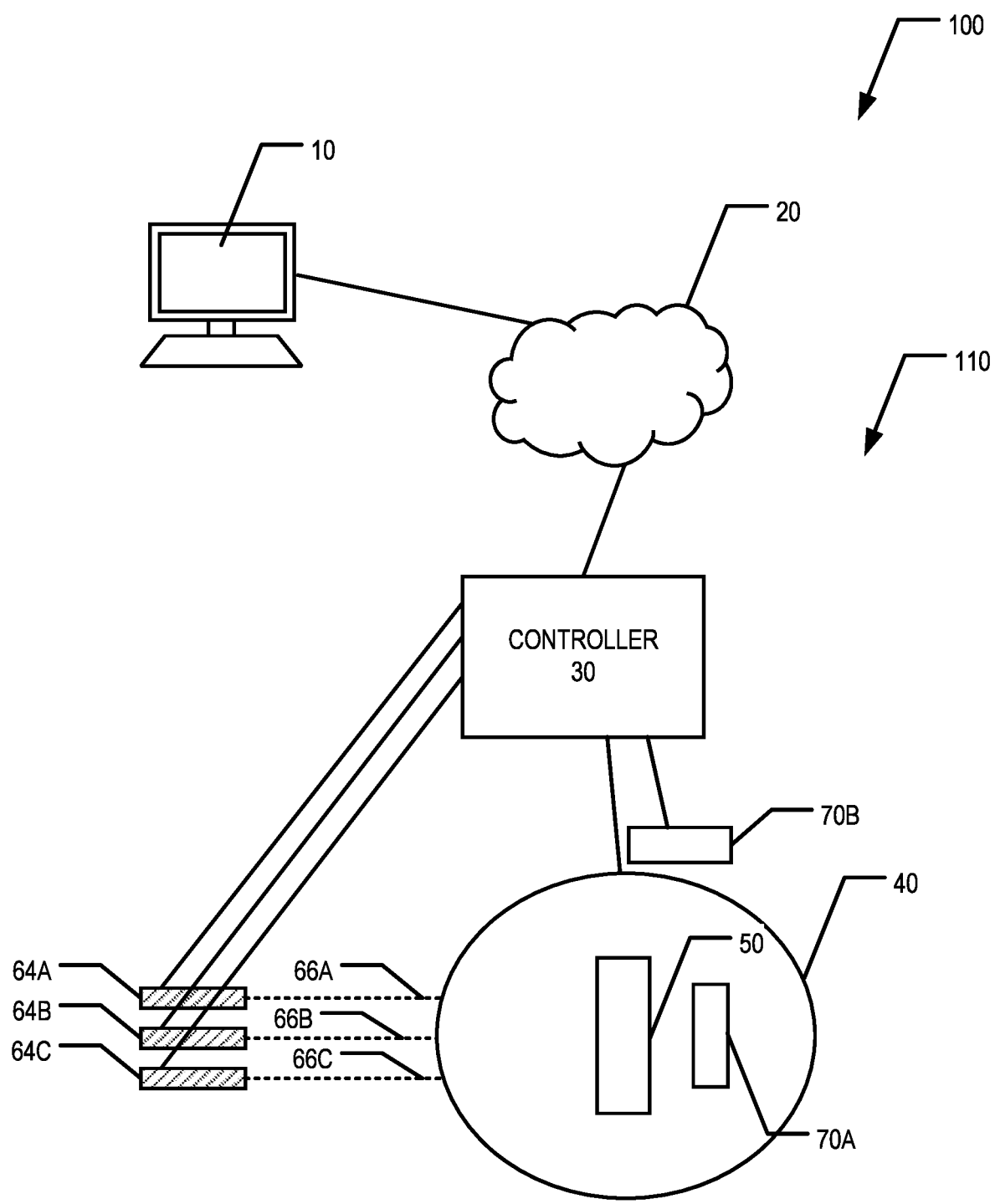

(58) Field of Classification Search
USPC .......................................................... 250/251
See application file for complete search history.

(56) References Cited

U.S. PATENT DOCUMENTS

| | | | |
|---|---|---|---|
| 10,951,002 | B1 | 3/2021 | Bohn et al. |
| 2002/0117612 | A1 | 8/2002 | Kumagai et al. |
| 2003/0136131 | A1 | 7/2003 | Chu et al. |
| 2004/0200952 | A1 | 10/2004 | Beausoleil et al. |
| 2020/0116623 | A1* | 4/2020 | Cooper-Roy ...... G01N 21/6404 |
| 2020/0185120 | A1 | 6/2020 | Keesling et al. |
| 2021/0136902 | A1 | 5/2021 | Chang et al. |
| 2021/0212764 | A1 | 7/2021 | Eskandar et al. |
| 2021/0272006 | A1* | 9/2021 | King .......................... G02F 3/00 |
| 2022/0222560 | A1 | 7/2022 | Monroe et al. |
| 2023/0050581 | A1* | 2/2023 | Kennedy ............... F25B 23/003 |

FOREIGN PATENT DOCUMENTS

| | | |
|---|---|---|
| CN | 109211414 A | 1/2019 |
| EP | 1227708 A1 | 7/2002 |
| JP | 2002-328199 A | 11/2002 |
| JP | 2012-019261 A | 1/2012 |
| JP | 2020-528357 A | 9/2020 |
| JP | 2020-187741 A | 11/2020 |
| JP | 2021-508382 A | 3/2021 |
| JP | 2021-090054 A | 6/2021 |
| JP | 2023-021954 A | 2/2023 |
| TW | 202134689 A | 9/2021 |

OTHER PUBLICATIONS

Decision to grant a European patent Mailed on Oct. 4, 2024 for EP Application No. 22187957, 2 page(s).
Communication about intention to grant a European patent Mailed on Jun. 3, 2024 for EP Application No. 22187957, 6 page(s).
Communication about intention to grant a European patent Mailed on May 24, 2024 for EP Application No. 22187951, 6 page(s).
English translation of JP Decision to Grant dated Feb. 13, 2024 for JP Application No. 2022123392, 2 page(s).
JP Decision to Grant Mailed on Feb. 13, 2024 for JP Application No. 2022123392, 4 page(s).
English translation of JP Decision to Grant dated Dec. 11, 2023 for JP Application No. 2022123391, 2 page(s).
English Translation of JP Office Action dated Aug. 14, 2023 for JP Application No. 2022123391, 2 page(s).
English Translation of JP Office Action dated Sep. 4, 2023 for JP Application No. 2022123392, 3 page(s).
English translation of JP Search report dated Jun. 15, 2023 for JP Application No. 2022123391, 17 page(s).
English translation of TW Notice of Allowance dated Nov. 29, 2023 for TW Application No. 111128914, 2 page(s).
English Translation of TW Office Action, including Search Report, dated Jun. 30, 2023 for TW Application No. 111128915, 3 page(s).
English Translation of TW Office Action, including Search Report, dated Oct. 26, 2023 for TW Application No. 111128914, 3 page(s).
Extended European search report Mailed on Jan. 30, 2023 for EP Application No. 22187951, 5 page(s).
Extended European search report Mailed on Jan. 30, 2023 for EP Application No. 22187957, 5 page(s).
Feng, L., et al., "Efficient Ground-State Cooling of Large Trapped-Ion Chains with an Electromagnetically-Induced-Transparency Tripod Scheme", Physical Review Letters, Jul. 29, 2020, 5 pages, vol. 125, No. 053001, American Physical Society, retrieved from the Internet at https://iontrap.umd.edu/wp-content/uploads/2012/12/EIT-PRL.pdf on Dec. 15, 2023, 5 pages.
Huang, T., et al., "Double-EIT laser cooling via amplitude and phase control of a microwave field", Optik, Mar. 2016, pp. 2978-2982, vol. 127, No. 5, Elsevier GmbH, Germany.
JP Decision to Grant Mailed on Dec. 11, 2023 for JP Application No. 2022123391, 3 page(s).
JP Office Action Mailed on Aug. 14, 2023 for JP Application No. 2022123391, 2 page(s).
JP Office Action, including Search Report, Mailed on Sep. 4, 2023 for JP Application No. 2022123392, 4 page(s).
JP Search report Mailed on Jun. 15, 2023 for JP Application No. 2022123391, 11 page(s).
Qiao, Mu, et al., "Double-EIT Ground-State Cooling of Stationary Two-Dimensional Ion Lattices", dated May 10, 2021, retrieved from the Internet at Cornell University's website <https://arxiv.org/pdf/2003.10276.pdf>, on Dec. 15, 2023, 19 pages.
Qiao, Mu, et al., "Double-Electromagnetically-Induced-Transparency Ground-State Cooling of Stationary Two-Dimensional Ion Crystals", Physical Review Letters, Jan. 13, 2021, pp. 1-19, vol. 126, No. 2, American Physical Society, US.
Sullivan, D. B., et al., "Primary Atomic Frequency Standards at NIST", Journal of Research of the National Institute of Standards and Technology, Jan.-Feb. 2001, pp. 47-63, vol. 106, No. 1, National Institute of Standard and Technology, US.
TW Notice of Allowance Mailed on Nov. 29, 2023 for TW Application No. 111128914, 2 page(s).
TW Office Action, including Search Report, Mailed on Jun. 30, 2023 for TW Application No. 111128915, 4 page(s).
TW Office Action, including Search Report, Mailed on Oct. 26, 2023 for TW Application No. 111128914, 4 page(s).
Urabe, Shinji, "Related Technologies and Applications of Laser-Cooled Ions: Laser-Cooled Ions and Their Applications," Journal of the Japan Society of Plasma and Nuclear Fusion, Jun. 2005, pp. 755-763, vol. 81, No. 10, J-STAGE, Japan.
English Translation of TW Office Action dated Feb. 19, 2024 for TW Application No. 111128915, 4 page(s).
TW Notice of Allowance Mailed on Feb. 19, 2024 for TW Application No. 111128915, 4 page(s).
Notice of Allowance and Fees Due (PTOL-85) Mailed on Mar. 26, 2025 for U.S. Appl. No. 17/812,040, 10 page(s).

* cited by examiner

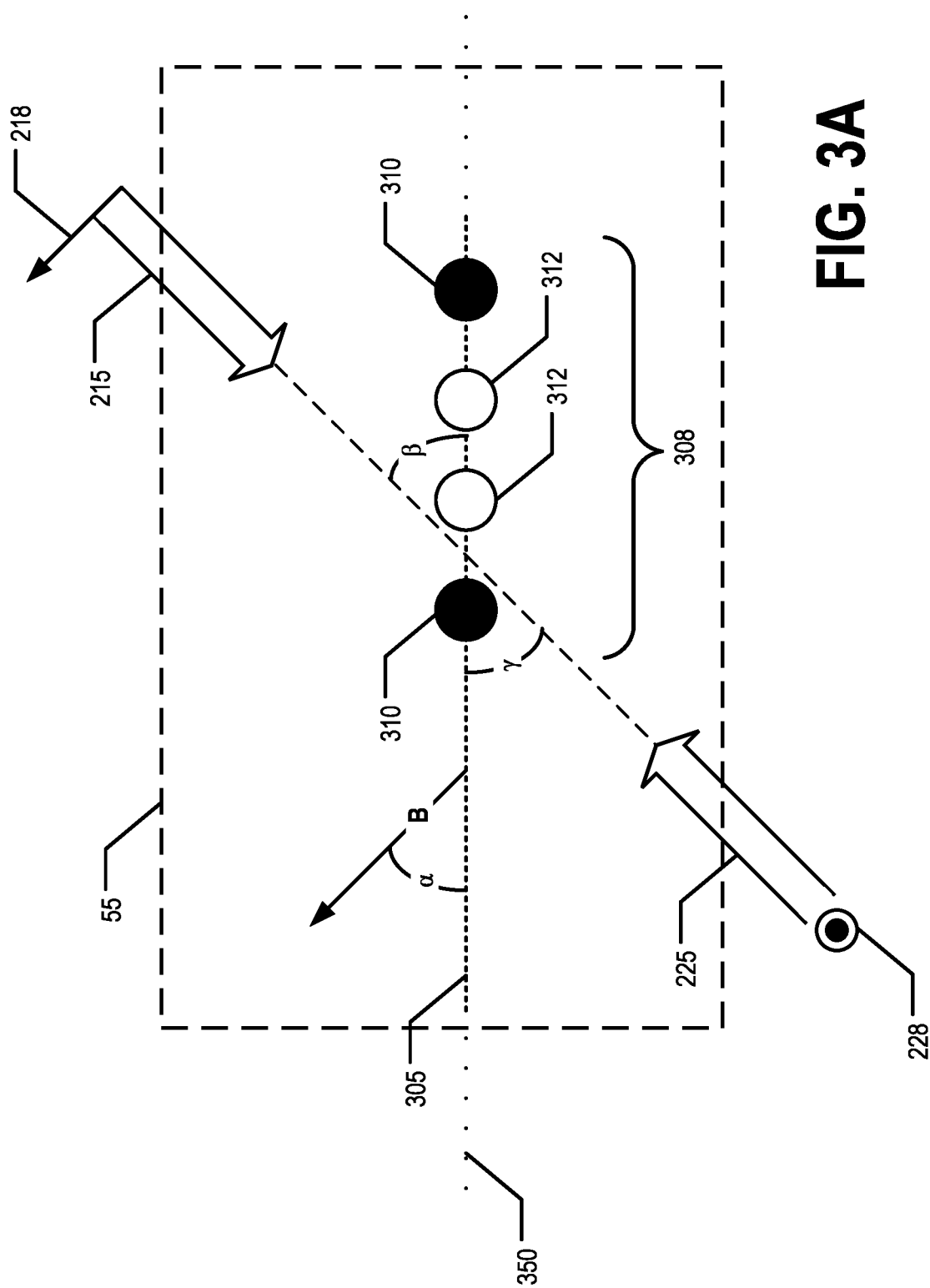

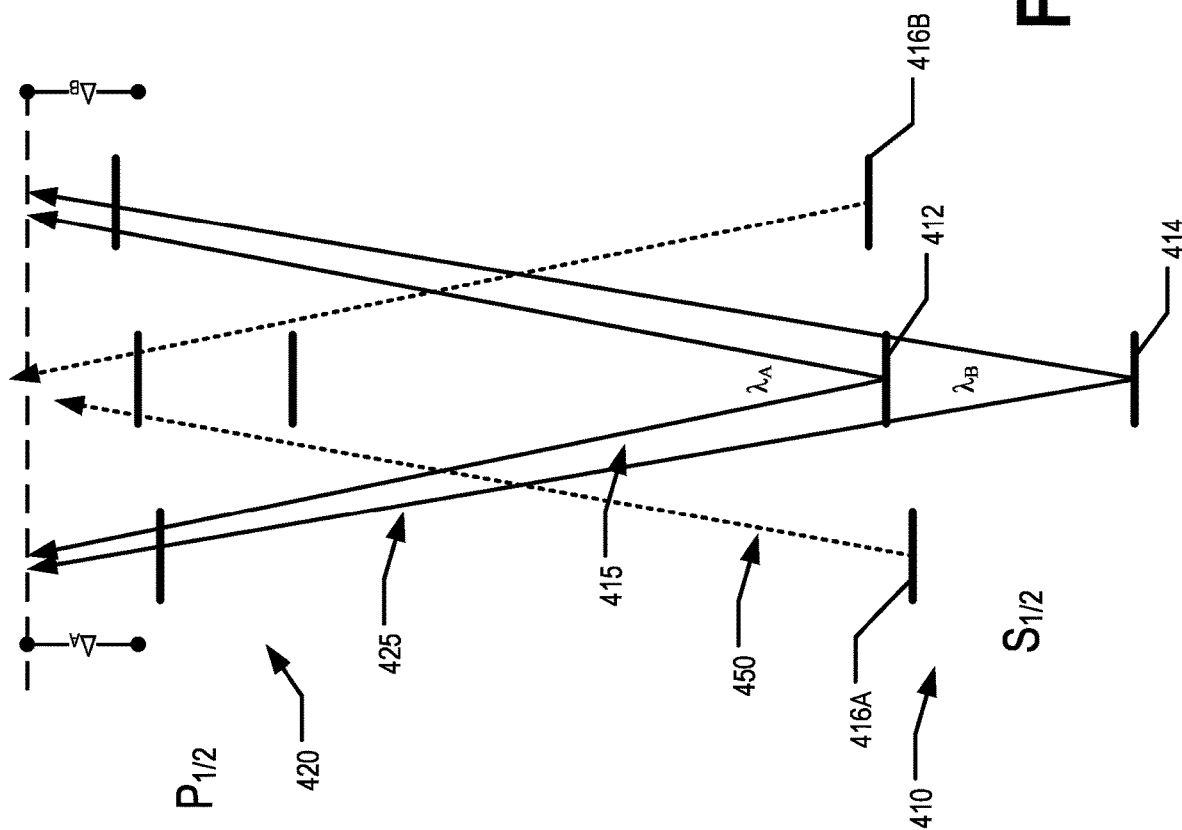

BROADBAND SYMPATHETIC ELECTROMAGNETICALLY-INDUCED TRANSPARENCY (EIT) COOLING

CROSS-REFERENCE TO RELATED APPLICATIONS

This application claims priority to U.S. Application No. 63/228,486, filed Aug. 2, 2021, the content of which is hereby incorporated by reference in its entirety.

TECHNICAL FIELD

Various embodiments relate to laser cooling of atomic objects confined by an atomic object confinement apparatus. For example, various embodiments relate to sympathetic EIT cooling using an S-to-P-to-D transition. For example, various embodiments relate to sympathetic EIT cooling using atomic object clock states.

BACKGROUND

In various scenarios, it is desirable to cool ions trapped by an ion trap such that various operations may be performed on the ions (e.g., experiments, controlled quantum evolution, and/or the like). However, conventional laser cooling techniques tend to be complicated and/or require high powered laser beams. Through applied effort, ingenuity, and innovation many deficiencies of such conventional laser cooling systems have been solved by developing solutions that are structured in accordance with the embodiments of the present invention, many examples of which are described in detail herein.

BRIEF SUMMARY OF EXAMPLE EMBODIMENTS

Example embodiments provide quantum computers, systems, apparatuses, and/or the like and corresponding methods for performing EIT cooling based on a two photon resonant transition between one or more states of an S manifold of a first component of an atomic object to one or more states of a D manifold of the first component of the atomic object by way of the P manifold of the first component of the atomic object. Example embodiments provide quantum computers, systems, apparatuses, and/or the like and corresponding methods for performing EIT cooling based on clock states of a first component of an atomic object. In various embodiments, an atomic object is an atomic crystal, group of atoms (neutral and/or ionized), or group of molecules (neutral and/or ionized) and a component (e.g., the first component) of the atomic object is at least one atom or molecule of a particular type (e.g., elemental type, chemical formula, and/or the like) of the atomic object. For example, in an example embodiment, the atomic object comprises a cooling ion of a first elemental type and a qubit ion of a second elemental type, where the cooling ion is referred to herein as the first component of the example atomic object. For example, the first component of the atomic object is cooled via EIT cooling and a second component of the atomic object is cooled via sympathetic cooling via interaction with the first component of the atomic object, in an example embodiment. In an example embodiment, the second component is used as a qubit of a quantum computer.

According to one aspect, a method for cooling an atomic object confined by an atomic object confinement apparatus is provided. In an example embodiment, the method comprises controlling, by a controller associated with the atomic object confinement apparatus, a first manipulation source to provide a first manipulation signal to a particular region of the atomic object confinement apparatus. The method further comprises controlling, by the controller, a second manipulation source to provide a second manipulation signal to the particular region of the atomic object confinement apparatus. The atomic object to be cooled is located in the particular region of the atomic object confinement apparatus. The first manipulation signal is characterized by a first wavelength corresponding to a transition between an S manifold and a P manifold of a first component of the atomic object and detuned from the transition between the S manifold and the P manifold by a first detuning. The second manipulation signal is characterized by a second wavelength corresponding to a transition between the P manifold and a D manifold of the first component of the atomic object and detuned from the transition between P manifold and the D manifold by a second detuning. The first and second detunings are selected to establish a dark state associated with a two photon transition between the S manifold and the D manifold.

In an example embodiment, the atomic object is an ion crystal comprising two or more ions and the first component of the atomic object is at least one of the two or more ions of a first atomic object type.

In an example embodiment, the first component of the atomic object is configured for use as a coolant ion in a sympathetic cooling scheme for the crystal.

In an example embodiment, a second component of the atomic object is at least one of the two or more ions of a second atomic object type, the second atomic object type being different from the first atomic object type, and wherein the at least one of the two or more ions of the second atomic object type is configured for use as a qubit of a quantum computer comprising the atomic object confinement apparatus.

In an example embodiment, the first detuning and the second detuning are substantially equal. In an example embodiment, the first manipulation signal is a $\pi$-polarized laser beam and the second manipulation signal is a $\sigma$-polarized laser beam.

In an example embodiment, a polarization of the first manipulation signal and a polarization of the second manipulation signal correspond to the two photon transition associated with the dark state.

In an example embodiment, the method further comprises causing generation of a magnetic field having a magnetic field direction in the particular region of the atomic object confinement apparatus, wherein one of the atomic object or the particular region of the atomic object confinement apparatus defines an atomic object axis, and the magnetic field direction is transverse to the atomic object axis.

In an example embodiment, the magnetic field direction and the atomic object axis form an angle in a range of thirty to sixty degrees.

In an example embodiment, the first manipulation signal defines a first propagation direction which is transverse to the atomic object axis and the second manipulation signal defines a second propagation direction which is transverse to the atomic object axis.

In an example embodiment, the first propagation direction and the second propagation direction are substantially antiparallel to one another and the magnetic field direction is transverse to both the first propagation direction and the second propagation direction.

In an example embodiment, both the first propagation direction and the second propagation direction are substantially perpendicular to the magnetic field direction.

In an example embodiment, (a) the polarization of the first manipulation signal is substantially transverse to a plane defined by the atomic object confinement apparatus, (b) the polarization of the second manipulation signal is substantially transverse to the plane defined by the atomic object confinement apparatus, and (c) the first propagation direction, the second propagation direction, and the magnetic field direction are respectively substantially parallel to the plane defined by the atomic confinement apparatus.

According to another aspect, an apparatus configured to cause and/or control cooling of an atomic object confined by an atomic object confinement apparatus is provided. In an example embodiment, the apparatus comprises at least one processor and memory storing computer-executable instructions. The computer-executable instructions are configured to, when executed by the at least one processor, cause the apparatus to at least control a first manipulation source to provide a first manipulation signal to a particular region of an atomic object confinement apparatus; and control a second manipulation source to provide a second manipulation signal to the particular region of the atomic object confinement apparatus. The atomic object to be cooled is located within the particular region of the atomic object confinement apparatus. The first manipulation signal and the second manipulation signal are configured to collectively cool the atomic object. The first manipulation signal is characterized by a first wavelength corresponding to a transition between an S manifold and a P manifold of a first component of the atomic object and detuned from the transition between the S manifold and the P manifold by a first detuning. The second manipulation signal is characterized by a second wavelength corresponding to a transition between the P manifold and a D manifold of the first component of the atomic object and detuned from the transition between P manifold and the D manifold by a second detuning. The first and second detunings are selected to establish a dark state associated with a two photon transition between the S manifold and the D manifold.

In an example embodiment, the apparatus is a controller of a quantum computer comprising the atomic object confinement apparatus.

In an example embodiment, the atomic object is an ion crystal comprising two or more ions and the first component of the atomic object is at least one of the two or more ions of a first atomic object type.

In an example embodiment, the first component of the atomic object is configured for use as a coolant ion in a sympathetic cooling scheme for the crystal.

In an example embodiment, a second component of the atomic object is at least one of the two or more ions of a second atomic object type, the second atomic object type being different from the first atomic object type, and wherein the at least one of the two or more ions of the second atomic object type is configured for use as a qubit of a quantum computer comprising the atomic object confinement apparatus.

In an example embodiment, the first detuning and the second detuning are substantially equal. In an example embodiment, the first manipulation signal is a π-polarized laser beam and the second manipulation signal is a σ-polarized laser beam.

In an example embodiment, a polarization of the first manipulation signal and a polarization of the second manipulation signal correspond to the two photon transition associated with the dark state.

In an example embodiment, the computer-executable instructions are further configured to, when executed by the at least one processor, cause the apparatus to at least cause generation of a magnetic field having a magnetic field direction in the particular region of the atomic object confinement apparatus, wherein one of the atomic object or the particular region of the atomic object confinement apparatus defines an atomic object axis, and the magnetic field direction is transverse to the atomic object axis.

In an example embodiment, the magnetic field direction and the atomic object axis form an angle in a range of thirty to sixty degrees.

In an example embodiment, the first manipulation signal defines a first propagation direction which is transverse to the atomic object axis and the second manipulation signal defines a second propagation direction which is transverse to the atomic object axis.

In an example embodiment, the first propagation direction and the second propagation direction are substantially anti-parallel to one another and the magnetic field direction is transverse to both the first propagation direction and the second propagation direction.

In an example embodiment, both the first propagation direction and the second propagation direction are substantially perpendicular to the magnetic field direction.

In an example embodiment, (a) the polarization of the first manipulation signal is substantially transverse to a plane defined by the atomic object confinement apparatus, (b) the polarization of the second manipulation signal is substantially transverse to the plane defined by the atomic object confinement apparatus, and (c) the first propagation direction, the second propagation direction, and the magnetic field direction are respectively substantially parallel to the plane defined by the atomic confinement apparatus.

According to yet another aspect, a system is provided. In an example embodiment, the system comprises an atomic object confinement apparatus configured to confine an atomic object in a particular region of the atomic object confinement apparatus; a first manipulation source controllable by a controller of the system and configured to provide a first manipulation signal to the particular region of the atomic object confinement apparatus; a second manipulation source controllable by the controller of the system and configured to provide a second manipulation signal to the particular region of the atomic object confinement apparatus; and the controller. The controller comprises at least one processor and memory storing computer-executable instructions, the computer-executable instructions are configured to, when executed by the at least one processor, cause the controller to at least control the first manipulation source to provide the first manipulation signal to the particular region of the atomic object confinement apparatus; and control the second manipulation source to provide the second manipulation signal to the particular region of the atomic object confinement apparatus. The first manipulation signal and the second manipulation signal are configured to collectively cool the atomic object. The first manipulation signal is characterized by a first wavelength corresponding to a transition between an S manifold and a P manifold of a first component of the atomic object and detuned from the transition between the S manifold and the P manifold by a first detuning. The second manipulation signal is characterized by a second wavelength corresponding to a transition between the P manifold and a D manifold of the first component of the atomic object and detuned from the transition between P manifold and the D manifold by a second detuning. The first and second detunings are selected to establish a dark state associated with a two photon transition between the S manifold and the D manifold.

In an example embodiment, the system is a quantum charge coupled device (QCCD)-based quantum computer.

In an example embodiment, the apparatus is a controller of a quantum computer comprising the atomic object confinement apparatus.

In an example embodiment, the atomic object is an ion crystal comprising two or more ions and the first component of the atomic object is at least one of the two or more ions of a first atomic object type.

In an example embodiment, the first component of the atomic object is configured for use as a coolant ion in a sympathetic cooling scheme for the crystal.

In an example embodiment, a second component of the atomic object is at least one of the two or more ions of a second atomic object type, the second atomic object type being different from the first atomic object type, and wherein the at least one of the two or more ions of the second atomic object type is configured for use as a qubit of a quantum computer comprising the atomic object confinement apparatus.

In an example embodiment, the first detuning and the second detuning are substantially equal.

In an example embodiment, the first manipulation signal is a π-polarized laser beam and the second manipulation signal is a σ-polarized laser beam.

In an example embodiment, a polarization of the first manipulation signal and a polarization of the second manipulation signal correspond to the two photon transition associated with the dark state.

In an example embodiment, the computer-executable instructions are further configured to, when executed by the at least one processor, cause the controller to at least cause generation of a magnetic field having a magnetic field direction in the particular region of the atomic object confinement apparatus, wherein one of the atomic object or the particular region of the atomic object confinement apparatus defines an atomic object axis, and the magnetic field direction is transverse to the atomic object axis.

In an example embodiment, the magnetic field direction and the atomic object axis form an angle in a range of thirty to sixty degrees.

In an example embodiment, the first manipulation signal defines a first propagation direction which is transverse to the atomic object axis and the second manipulation signal defines a second propagation direction which is transverse to the atomic object axis.

In an example embodiment, the first propagation direction and the second propagation direction are substantially anti-parallel to one another and the magnetic field direction is transverse to both the first propagation direction and the second propagation direction.

In an example embodiment, both the first propagation direction and the second propagation direction are substantially perpendicular to the magnetic field direction.

In an example embodiment, (a) the polarization of the first manipulation signal is substantially transverse to a plane defined by the atomic object confinement apparatus, (b) the polarization of the second manipulation signal is substantially transverse to the plane defined by the atomic object confinement apparatus, and (c) the first propagation direction, the second propagation direction, and the magnetic field direction are respectively substantially parallel to the plane defined by the atomic confinement apparatus.

According to one aspect, a method for cooling an atomic object confined by an atomic object confinement apparatus is provided. In an example embodiment, the method comprises controlling, by a controller associated with the atomic object confinement apparatus, a first manipulation source to provide a first manipulation signal to a particular region of the atomic object confinement apparatus. The method further comprises controlling, by the controller, a second manipulation source to provide a second manipulation signal to the particular region of the atomic object confinement apparatus. The atomic object to be cooled is located in the particular region of the atomic object confinement apparatus. The first manipulation signal is characterized by a first wavelength corresponding to a first transition between a first clock state of an S manifold and a P manifold of a first component of the atomic object and detuned from the first transition by a first detuning. The second manipulation signal is characterized by a second wavelength corresponding to a second transition between a second clock state of the S manifold and the P manifold of the first component of the atomic object and detuned from the second transition by a second detuning. The first and second detunings are selected to establish a dark state associated with a two photon transition between the first clock state and the second clock state.

In an example embodiment, the atomic object is an ion crystal comprising two or more ions and the first component of the atomic object is at least one of the two or more ions of a first atomic object type.

In an example embodiment, the first component of the atomic object is configured for use as a cooling ion in a sympathetic cooling scheme for the ion crystal.

In an example embodiment, a second component of the atomic object is at least one of the two or more ions of a second atomic object type, the second atomic object type being different from the first atomic object type, and wherein the at least one of the two or more ions of the second atomic object type is configured for use as a qubit of a quantum computer comprising the atomic object confinement apparatus.

In an example embodiment, the first atomic object type is singly ionized ytterbium.

In an example embodiment, the first detuning and the second detuning are substantially equal.

In an example embodiment, the method further comprises causing or controlling generation of a magnetic field having a magnetic field direction in the particular region of the atomic object confinement apparatus, and the magnetic field direction is transverse to a propagation direction of the first manipulation signal.

In an example embodiment, the first manipulation signal is characterized by a first polarization that is a linear polarization substantially parallel to a plane defined by the atomic object confinement apparatus and the second manipulation signal is characterized by a second polarization that is a linear polarization substantially perpendicular to the plane defined by the atomic object.

In an example embodiment, the method further comprises causing generation of a magnetic field having a magnetic field direction in the particular region of the atomic object confinement apparatus, wherein the magnetic field direction is transverse to the first polarization.

In an example embodiment, the first manipulation signal is characterized by a first polarization and the second manipulation signal is characterized by a second polarization, the first polarization being transverse to the second polarization.

In an example embodiment, the first clock state is an F=1, m=0 state and the second clock state is an F=0, m=0 state.

According to another aspect, an apparatus configured to cause and/or control cooling of an atomic object confined by an atomic object confinement apparatus is provided. In an example embodiment, the apparatus comprises at least one processor and memory storing computer-executable instructions. The computer-executable instructions are configured to, when executed by the at least one processor, cause the apparatus to at least control a first manipulation source to provide a first manipulation signal to a particular region of an atomic object confinement apparatus; and control a second manipulation source to provide a second manipulation signal to the particular region of the atomic object confinement apparatus. The atomic object to be cooled is located within the particular region of the atomic object confinement apparatus. The first manipulation signal and the second manipulation signal are configured to collectively cool the atomic object. The first manipulation signal is characterized by a first wavelength corresponding to a first transition between a first clock state of an S manifold and a P manifold of a first component of the atomic object and detuned from the first transition by a first detuning. The second manipulation signal is characterized by a second wavelength corresponding to a second transition between a second clock state of the S manifold and the P manifold of the first component of the atomic object and detuned from the second transition by a second detuning. The first and second detunings are selected to establish a dark state associated with a two photon transition between the first clock state and the second clock state.

In an example embodiment, the atomic object is an ion crystal comprising two or more ions and the first component of the atomic object is at least one of the two or more ions of a first atomic object type.

In an example embodiment, the first component of the atomic object is configured for use as a cooling ion in a sympathetic cooling scheme for the ion crystal.

In an example embodiment, a second component of the atomic object is at least one of the two or more ions of a second atomic object type, the second atomic object type being different from the first atomic object type, and wherein the at least one of the two or more ions of the second atomic object type is configured for use as a qubit of a quantum computer comprising the atomic object confinement apparatus.

In an example embodiment, the first atomic object type is singly ionized ytterbium.

In an example embodiment, the first detuning and the second detuning are substantially equal.

In an example embodiment, a magnetic field having a magnetic field direction is present in the particular region of the atomic object confinement apparatus and the magnetic field direction is transverse to a propagation direction of the first manipulation signal.

In an example embodiment, the first manipulation signal is characterized by a first polarization that is a linear polarization substantially parallel to a plane defined by the atomic object confinement apparatus and the second manipulation signal is characterized by a second polarization that is a linear polarization substantially perpendicular to the plane defined by the atomic object.

In an example embodiment, a magnetic field having a magnetic field direction is present in the particular region of the atomic object confinement apparatus, and the magnetic field direction is transverse to the first polarization.

In an example embodiment, the first manipulation signal is characterized by a first polarization and the second manipulation signal is characterized by a second polarization, the first polarization being transverse to the second polarization.

In an example embodiment, the first clock state is an F=1, m=0 state and the second clock state is an F=0, m=0 state.

In an example embodiment, the apparatus is a controller of a quantum charge coupled device (QCCD)-based quantum computer.

According to yet another aspect, a system is provided. In an example embodiment, the system comprises an atomic object confinement apparatus configured to confine an atomic object in a particular region of the atomic object confinement apparatus; a first manipulation source controllable by a controller of the system and configured to provide a first manipulation signal to the particular region of the atomic object confinement apparatus; a second manipulation source controllable by the controller of the system and configured to provide a second manipulation signal to the particular region of the atomic object confinement apparatus; and the controller comprising at least one processor and memory storing computer-executable instructions. The computer-executable instructions are configured to, when executed by the at least one processor, cause the controller to at least control a first manipulation source to provide a first manipulation signal to a particular region of an atomic object confinement apparatus; and control a second manipulation source to provide a second manipulation signal to the particular region of the atomic object confinement apparatus. The first manipulation signal and the second manipulation signal are configured to collectively cool the atomic object. The first manipulation signal is characterized by a first wavelength corresponding to a first transition between a first clock state of an S manifold and a P manifold of a first component of the atomic object and detuned from the first transition by a first detuning. The second manipulation signal is characterized by a second wavelength corresponding to a second transition between a second clock state of the S manifold and the P manifold of the first component of the atomic object and detuned from the second transition by a second detuning. The first and second detunings are selected to establish a dark state associated with a two photon transition between the first clock state and the second clock state.

In an example embodiment, the atomic object is an ion crystal comprising two or more ions and the first component of the atomic object is at least one of the two or more ions of a first atomic object type.

In an example embodiment, the first component of the atomic object is configured for use as a cooling ion in a sympathetic cooling scheme for the ion crystal.

In an example embodiment, a second component of the atomic object is at least one of the two or more ions of a second atomic object type, the second atomic object type being different from the first atomic object type, and wherein the at least one of the two or more ions of the second atomic object type is configured for use as a qubit of a quantum computer comprising the atomic object confinement apparatus.

In an example embodiment, the first atomic object type is singly ionized ytterbium.

In an example embodiment, the first detuning and the second detuning are substantially equal.

In an example embodiment, a magnetic field having a magnetic field direction is present in the particular region of the atomic object confinement apparatus and the magnetic field direction is transverse to a propagation direction of the first manipulation signal.

In an example embodiment, the first manipulation signal is characterized by a first polarization that is a linear polarization substantially parallel to a plane defined by the atomic object confinement apparatus and the second manipulation signal is characterized by a second polarization that is a linear polarization substantially perpendicular to the plane defined by the atomic object.

In an example embodiment, a magnetic field having a magnetic field direction is present in the particular region of the atomic object confinement apparatus, and the magnetic field direction is transverse to the first polarization.

In an example embodiment, the first manipulation signal is characterized by a first polarization and the second manipulation signal is characterized by a second polarization, the first polarization being transverse to the second polarization.

In an example embodiment, the first clock state is an F=1, m=0 state and the second clock state is an F=0, m=0 state.

In an example embodiment, the system is a quantum charge coupled device (QCCD)-based quantum computer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides block diagram of an example atomic object quantum computer, in accordance with an example embodiment.

Figure 2A:
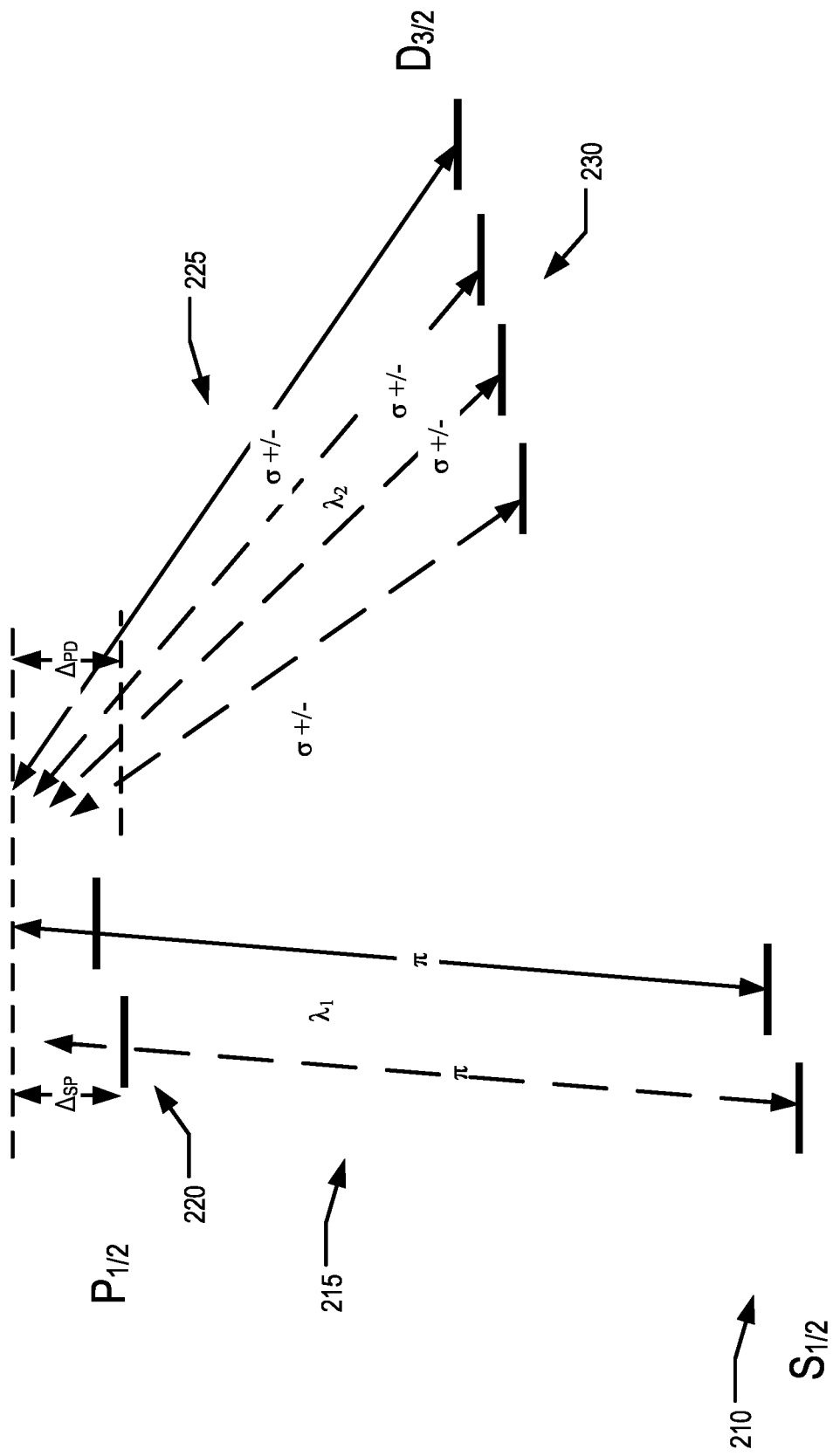

FIG. 2A provides a level diagram of a first component of an atomic object illustrating performance of a cooling operation, in accordance with an example embodiment.

Figure 2B:
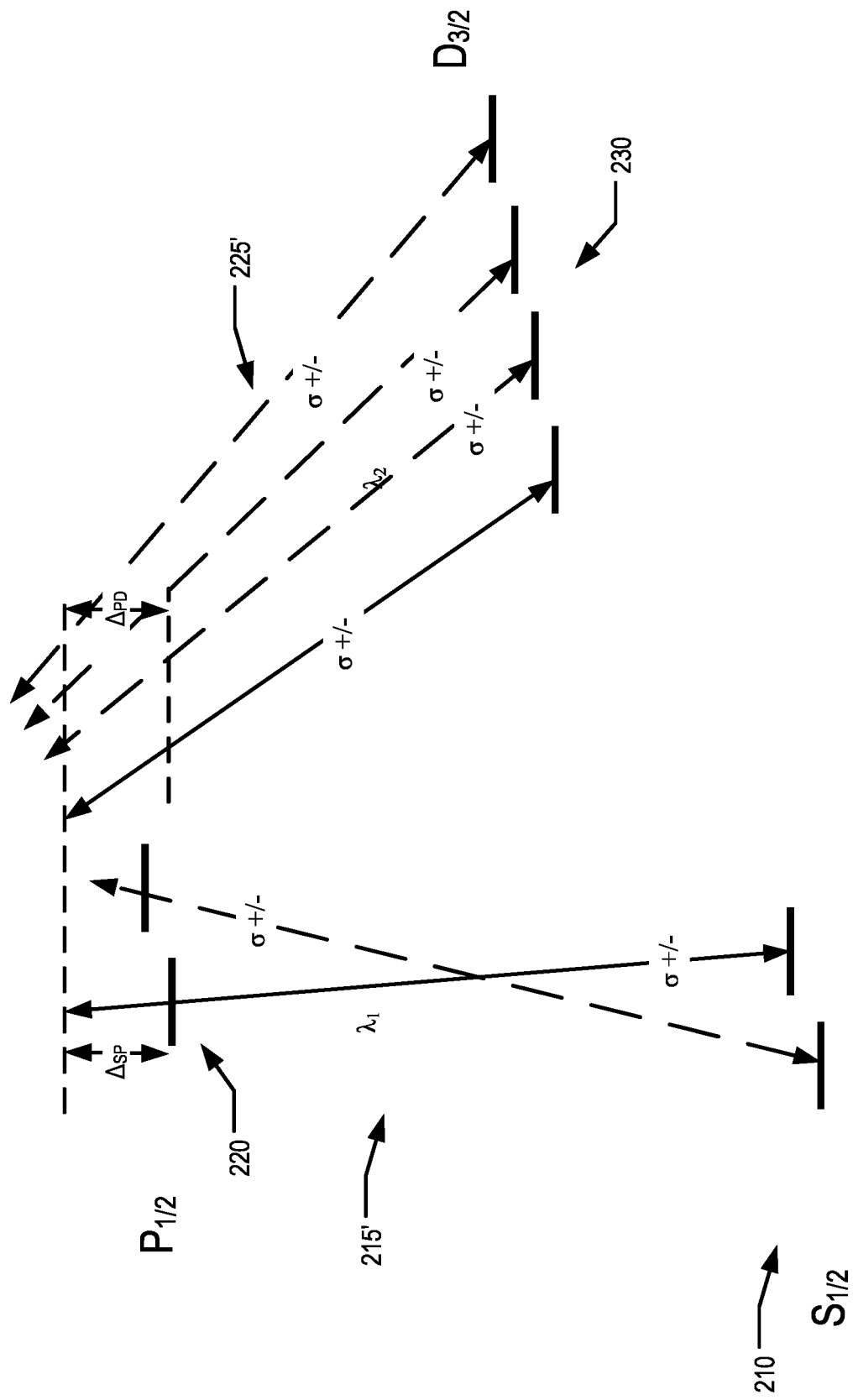

FIG. 2B provides a level diagram of a first component of an atomic object illustrating performance of a cooling operation, in accordance with another example embodiment.

FIG. 3A provides a schematic diagram illustrating performance of a cooling operation corresponding to the level diagram shown in FIG. 2A, in accordance with an example embodiment.

Figure 3B:
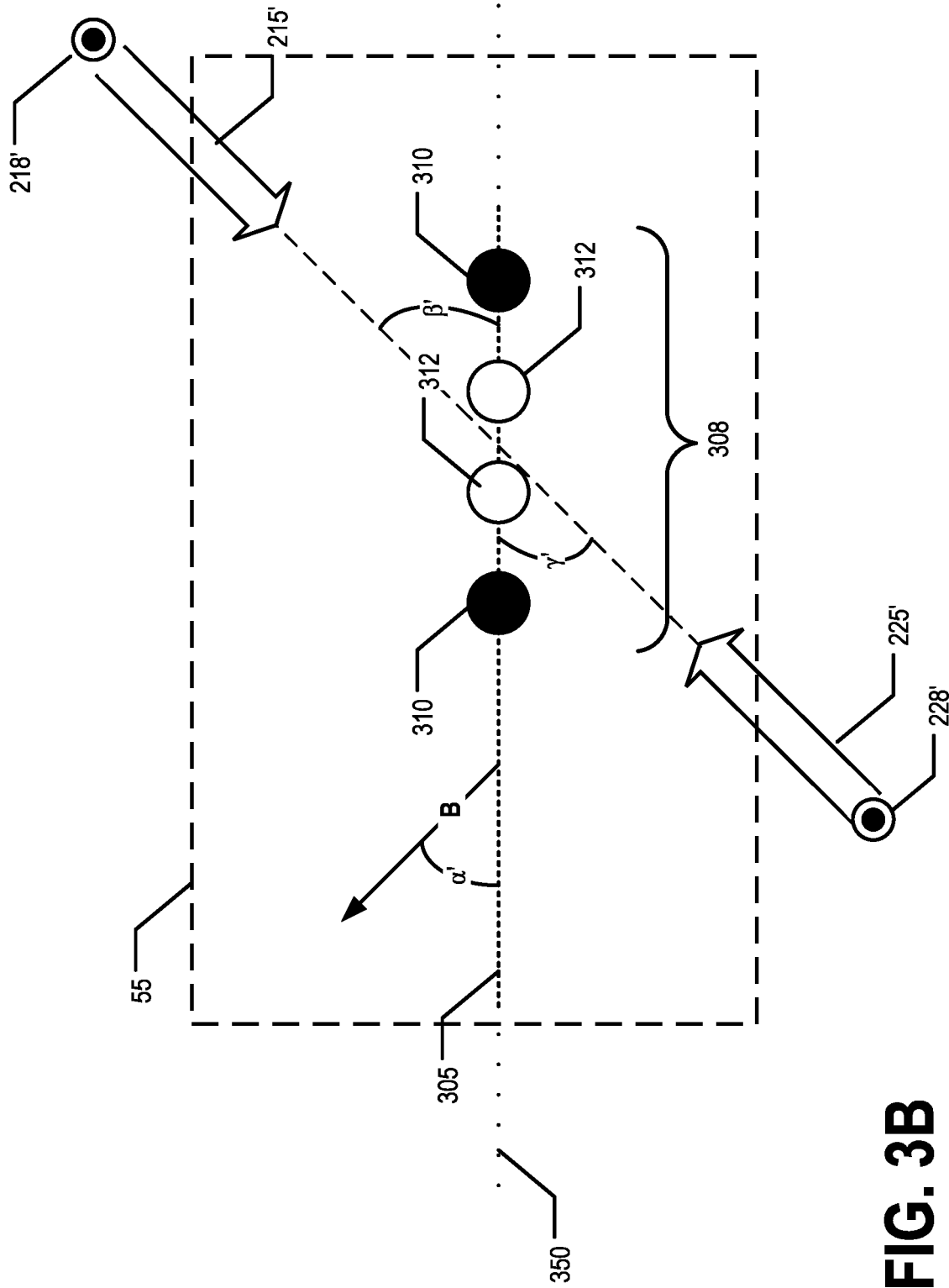

FIG. 3B provides a schematic diagram illustrating performance of another cooling operation corresponding to the level diagram shown in FIG. 2B, in accordance with example embodiment.

FIG. 4 provides a level diagram of a first component of an atomic object illustrating performance of a cooling operation, in accordance with another example embodiment.

Figure 5:
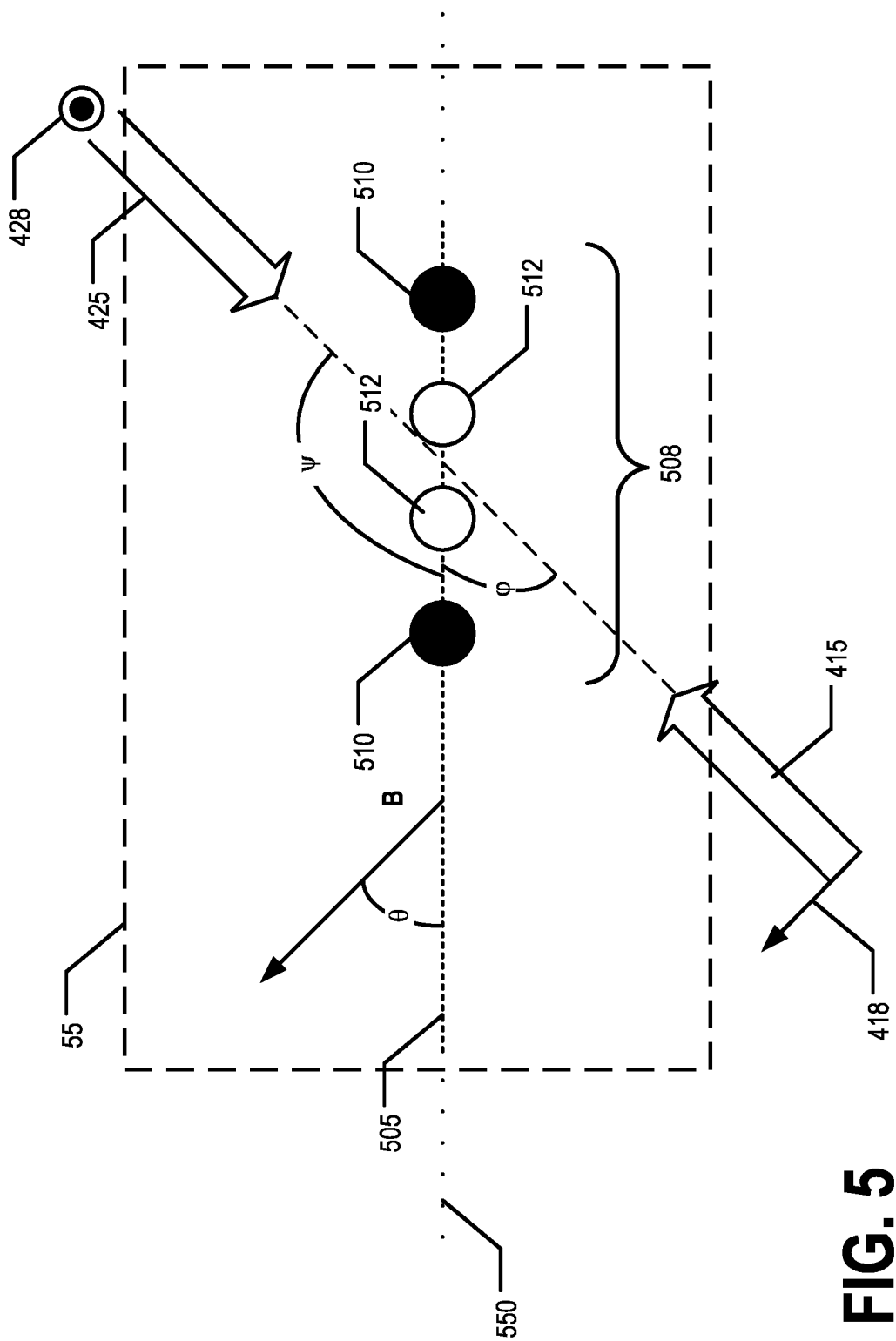

FIG. 5 provides a schematic diagram illustrating performance of a cooling operation corresponding to the level diagram shown in FIG. 4, in accordance with an example embodiment.

Figure 6:
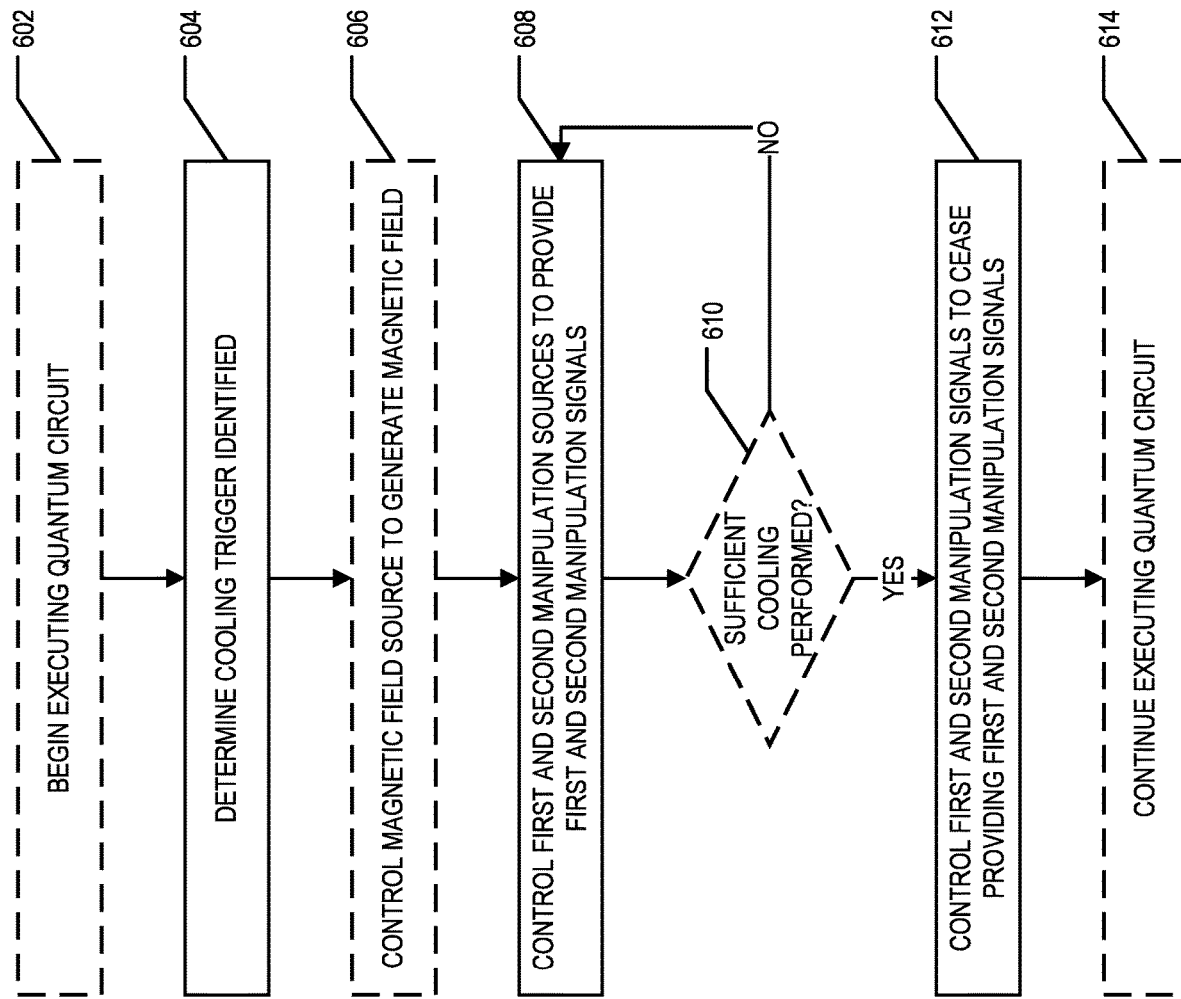

FIG. 6 provides a flowchart illustrating various processes and/or procedures of a cooling operation, in accordance with an example embodiment.

Figure 7:
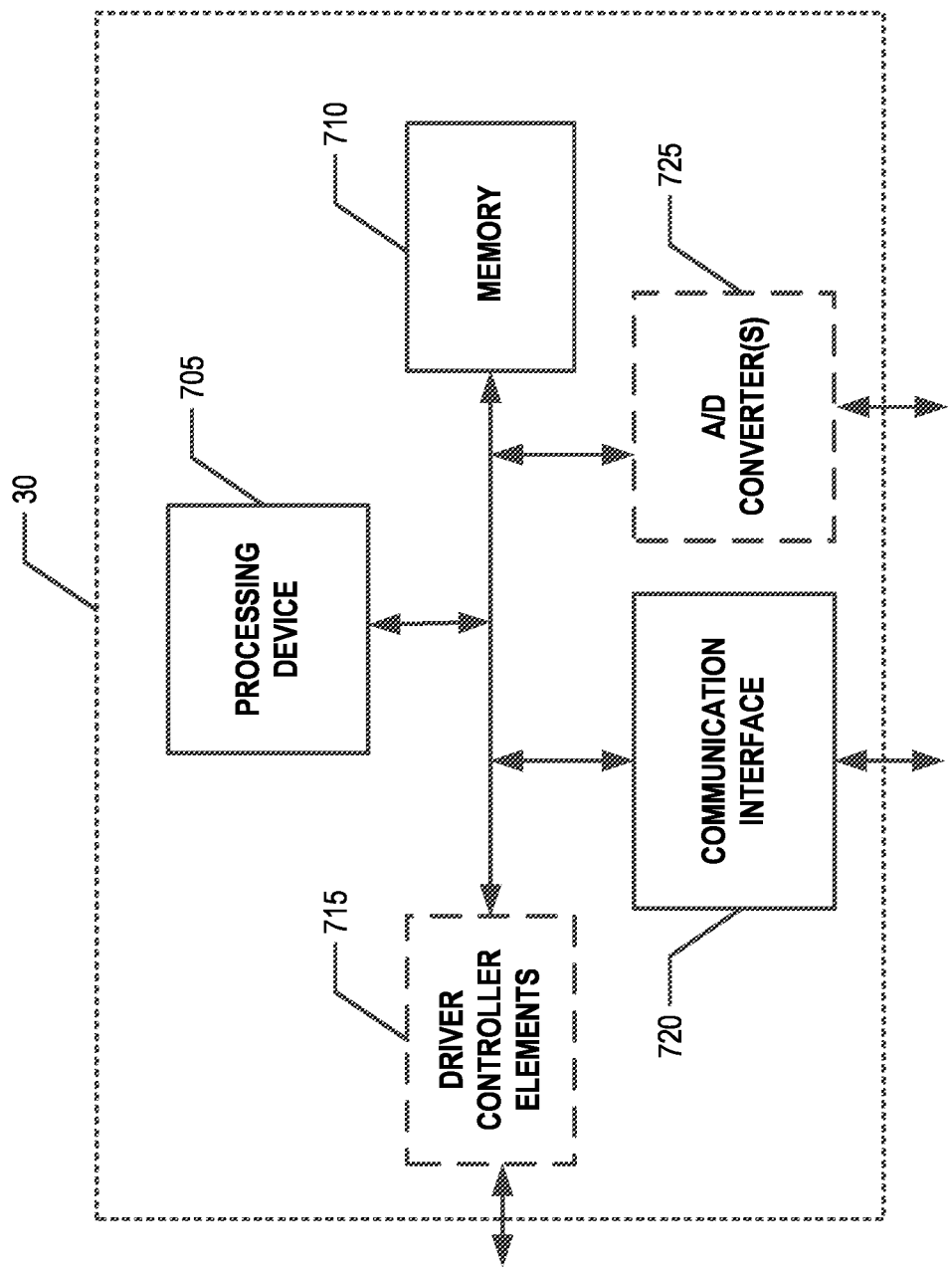

FIG. 7 provides a schematic diagram of an example controller of a quantum computer comprising an atomic object confinement apparatus configured for confining atomic objects therein, in accordance with an example embodiment.

Figure 8:
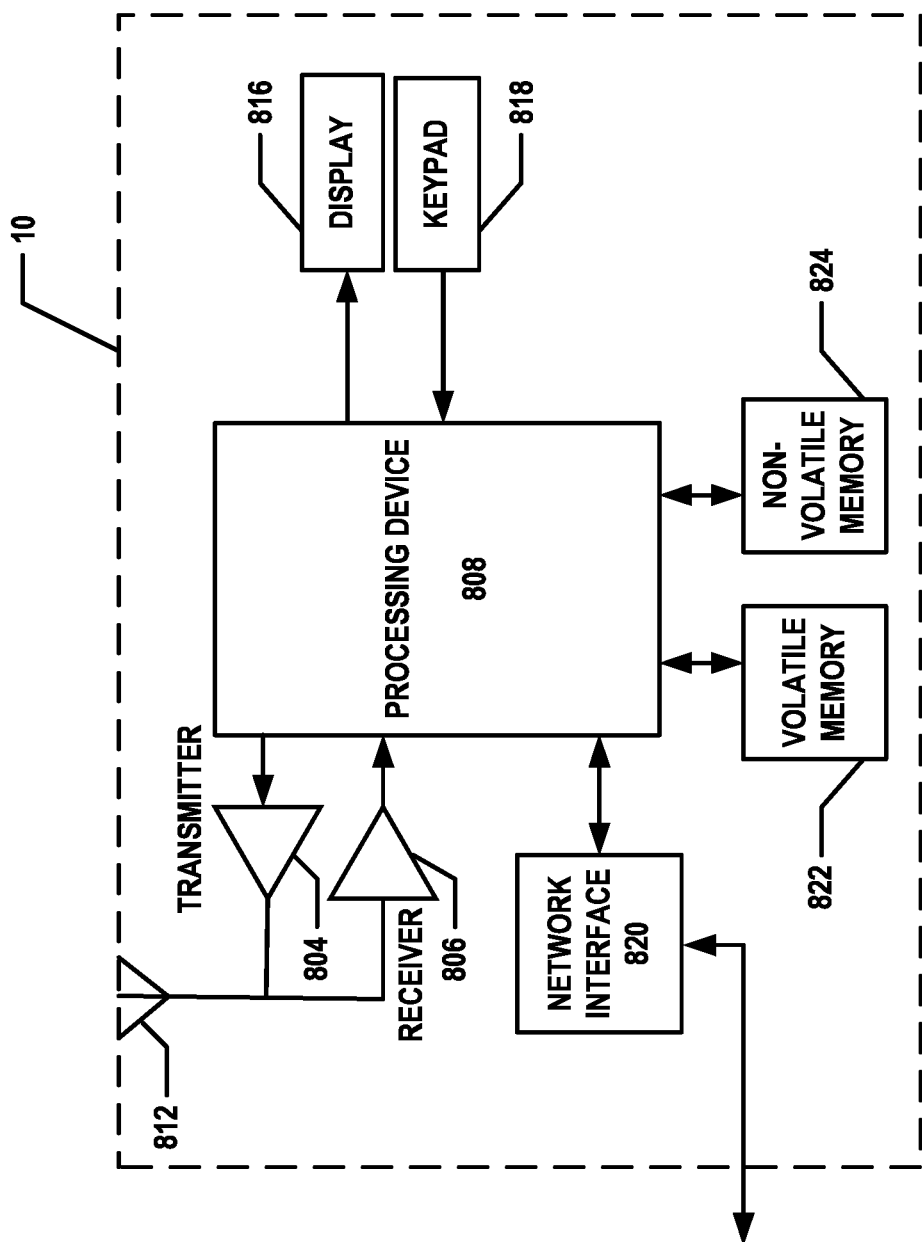

FIG. 8 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within applicable engineering and/or manufacturing tolerances and/or within user measurement capabilities, unless otherwise indicated. Like numbers refer to like elements throughout.

In various scenarios, atomic objects are confined within an atomic object confinement apparatus. In various embodiments, the atomic object confinement apparatus is an ion trap, such as a surface ion trap, Paul ion trap, and/or the like. In various embodiments, the atomic objects are ions, atoms, ion crystals, atomic crystals, and/or the like. In an example embodiment, the atomic objects comprise two or more ions where a first component of the atomic objects are one or more ions of a first atomic type (e.g., a first chemical element, an ion of a first atomic number, and/or the like). In an example embodiment, the atomic objects comprise two or more ions where a second component of the atomic objects are one or more ions of a second atomic type (e.g., a second chemical element, an ion of a second atomic number, and/or the like). In an example embodiment, the first component of the atomic object (the ions of the first atomic type) is one or more cooling ions for use in a sympathetic cooling scheme for the atomic object. In an example embodiment, the second component of the atomic object (e.g., the ions of the second atomic object type) is one or more qubit ions for use as qubits of a quantum computer.

In various embodiments, the atomic objects confined within the atomic object confinement apparatus are used to perform experiments, controlled quantum state evolution, quantum computations, and/or the like. In various embodiments, in order for the atomic objects confined within the atomic object confinement apparatus to be used to perform the experiments, controlled quantum state evolution, quantum computations, and/or the like, the atomic objects need to be at a low temperature and/or cooled near the motional ground state for the atomic object and/or the components thereof. In various embodiments, laser cooling is used to reduce the motional energy of the atomic object and/or components thereof. For example, in an example embodiment, the first components of the atomic objects are cooling ions used to sympathetically cool qubit ions and the second components of the atomic objects are the qubit ions used as qubits of a quantum computer.

Conventional types of laser cooling include Doppler cooling and resolved sideband cooling. Doppler cooling includes cooling atomic objects via an optical transition that is broad compared to the atomic objects secular frequency. An atomic object's secular frequency is the frequency with which the atomic object oscillates in response to a confining potential and/or pseudopotential of the atomic object confinement apparatus, such as that generated by applying a radio frequency voltage signal to a radio frequency electrode and/or rail of a Paul surface ion trap, for example. Doppler cooling is relatively easy to perform, but generally cannot be used to cool atomic objects and/or components thereof to sufficiently low temperatures. Resolved sideband cooling refers to cooling atomic objects via an optical transition that is narrow compared to the atomic object's secular frequency.

However, resolved sideband cooling is technically demanding and requires relatively high powered laser beams to perform sufficient cooling.

EIT cooling is another form of laser cooling. EIT cooling includes applying two laser fields and a magnetic field to the atomic object. The laser fields are detuned from respective transitions of the first component of the atomic object. Cooling occurs when stronger photon absorption occurs on the red-detuned motional sidebands compared to the blue-detuned motional sidebands.

Two example EIT cooling operations are described herein. The first is an S-to-P-to-D EIT cooling operation that may be used, for example, with atomic objects where the first component is singly ionized barium (138Ba) atoms or another atomic object component having a similar energy structure (e.g., similar fine structure and/or hyperfine structure, such as singly-ionized 88Sr, for example). For example, the S-to-P-to-D EIT cooling operation may be used with atomic objects where the first component has a low lying D manifold. As used herein, a low lying D manifold is a manifold of states with orbital angular momentum quantum number l=2 that have respectively lower energy than a P manifold of states with angular momentum quantum number l=1.

The second example EIT cooling operation described herein is a clock state EIT cooling operation. For example, the clock state EIT cooling operation is configured for use with atomic objects where the first component is singly ionized ytterbium (e.g., 171Yb) atoms or another atomic object component having a similar energy structure (e.g., similar fine structure and/or hyperfine structure). For example, the clock state EIT cooling operation may be performed with atomic objects where the first component has electron spin ½ and nuclear spin ½. For example, the energy structure of the first component of the atomic object comprises a low-energy manifold containing two states that form a pair of "clock" states, the defining feature of which is that the energy difference between the two states is insensitive to magnetic field fluctuations. For example, the $S_{1/2}$, F=0, M=0 and $S_{1/2}$, F=1, M=0 states in singly-ionized 171Yb are an example of such a pair of clock states. The pair of clock states permits transitions to a common higher-energy manifold, such as the P manifold in 171Yb, with a linewidth that is large enough to allow convenient laser coupling. In illustrated example described with respect to FIG. 4, the clock states couple to the P manifold via σ+/− transitions. Another example first component of an atomic object with a similar energy structure is singly-ionized 133Ba.

Exemplary Quantum Computer System

Laser cooling of atomic objects confined by an atomic object confinement apparatus may be performed in a wide variety of contexts and/or for a wide variety of applications. One example context is quantum charge-coupled device (QCCD)-based quantum computing. FIG. 1 provides a block diagram of an example quantum computer system 100. In various embodiments, the quantum computer system 100 comprises a computing entity 10 and a quantum computer 110.

In various embodiments, the quantum computer 110 comprises a controller 30, a cryogenic and/or vacuum chamber 40 enclosing an atomic object confinement apparatus 50 having atomic objects confined thereby, and one or more manipulation sources 64 (e.g., 64A, 64B, 64C). In an example embodiment, the one or more manipulation sources 64 may comprise one or more lasers (e.g., optical lasers, microwave sources and/or masers, and/or the like) or another manipulation source. In various embodiments, the one or more manipulation sources 64 are configured to manipulate and/or cause a controlled quantum state evolution of one or more atomic objects within the apparatus 50. For example, a first manipulation source 64A is configured to generate and/or provide a first manipulation signal and a second manipulation source 64B is configured to generate and/or provide a second manipulation signal, wherein the first and second manipulation signals are configured to collectively laser cool atomic objects confined by the atomic object confinement apparatus.

In various embodiments, the atomic object confinement apparatus 50 is an ion trap, such as a surface ion trap, Paul ion trap, and/or the like. In various embodiments, the atomic objects are ions, atoms, ion crystals, atomic crystals, and/or the like. In an example embodiment, the atomic objects comprise two or more ions where a first component of the atomic objects are one or more ions of a first atomic type (e.g., a first chemical element, an ion of a first atomic number, and/or the like). In an example embodiment, the atomic objects comprise two or more ions where a second component of the atomic objects are one or more ions of a second atomic type (e.g., a second chemical element, an ion of a second atomic number, and/or the like). In an example embodiment, the first component of the atomic object (the ions of the first atomic type) is one or more cooling ions for use in a sympathetic cooling scheme for the atomic object. In an example embodiment, the second component of the atomic object (e.g., the ions of the second atomic object type) is one or more qubit ions for use as qubits of a quantum computer. For example, in an example embodiment, the atomic object is an ion crystal comprising a singly ionized Ba atom used as a cooling ion and a singly ionized Yb ion used as a qubit ion. In another example embodiment, the atomic object is an ion crystal comprising a singly ionized Yb atom used as a cooling ion and a singly ionized Ba ion used as a qubit ion.

In an example embodiment, the one or more manipulation sources 64 each provide a manipulation signal (e.g., laser beam and/or the like) to one or more regions of the atomic object confinement apparatus 50 via corresponding beam paths 66 (e.g., 66A, 66B, 66C). In various embodiments, at least one beam path 66 comprises a modulator configured to modulate the manipulation signal being provided to the apparatus 50 via the beam path 66. In various embodiments, the manipulation sources 64, modulator, and/or other components of the quantum computer 110 are controlled by the controller 30.

In various embodiments, the quantum computer 110 comprises one or more magnetic field generators 70 (e.g., 70A, 70B). For example, the magnetic field generator may be an internal magnetic field generator 70A disposed within the cryogenic and/or vacuum chamber 40 and/or an external magnetic field generator 70B disposed outside of the cryogenic and/or vacuum chamber 40. In various embodiments, the magnetic field generators 70 are permanent magnets, Helmholtz coils, electrical magnets, and/or the like. In various embodiments, the magnetic field generators 70 are configured to generate a magnetic field at one or more regions of the atomic object confinement apparatus 50 that has a particular magnitude and a particular magnetic field direction in the one or more regions of the atomic object confinement apparatus 50.

In various embodiments, the controller 30 is configured to control voltage sources, electrical signal sources, and/or drivers controlling the atomic object confinement apparatus 50 and/or transport of atomic objects within the atomic object confinement apparatus 50, a cryogenic system and/or vacuum system controlling the temperature and pressure within the cryogenic and/or vacuum chamber 40, manipulation sources 64, magnetic field generators 70, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the atomic object confinement apparatus 50.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms, quantum circuits, and/or the like into a computing language, executable instructions, command sets, and/or the like that the controller 30 can understand and/or implement.

Example S-to-P-to-D EIT Cooling Operation

Various embodiments provide quantum computers, systems, apparatuses, and/or the like and corresponding methods for performing EIT cooling based on a two photon resonant transition between one or more states of an S manifold of a first component of an atomic object to one or more states of a D manifold of the first component of the atomic object by way of the P manifold of the first component of the atomic object.

Conventionally, EIT cooling of ions having a Batlike energy structure (e.g., similar fine and/or hyperfine energy structure to a singly ionized Ba atom) includes coupling a first (Zeeman) state in a ground manifold (e.g., S manifold corresponding to angular momentum quantum number l=0) to an excited state in an excited manifold and the excited state in the excited manifold to a second (Zeeman) state in the ground manifold (e.g., S manifold) using a single laser for both couplings. In other words, conventional EIT cooling couples two states within the same manifold using a two photon transition.

However, for atomic objects or first components of the atomic objects having low lying D manifolds, atomic objects or first components of the atomic objects may get "stuck" in the D manifold. As used herein, a low lying D manifold is a manifold of states with orbital angular momentum quantum number l=2 that have respectively lower energy than a P manifold of states with orbital angular momentum quantum number l=1. Thus, conventional EIT cooling requires additional elements and steps to effectively cool an atomic object having a first component that has a low lying D manifold. Thus, technical problems exist as to how to efficiently, effectively, and robustly cool atomic objects to near their motional ground state.

Various embodiments provide technical solutions to these technical problems. In various embodiments, an EIT cooling operation is performed using a first manipulation signal that couples one or more states of the S manifold to one or more states of the P manifold and a second manipulation signal that couples the one or more states of the P manifold to one or more states of the D manifold. In various embodiments, both the first manipulation signal and the second manipulation signal are detuned above the one or more states of the P manifold to establish a dark state associated with a two photon transition between the S manifold and the D manifold. By coupling the S manifold to the P manifold and the P manifold to the D manifold, efficient cooling can be accomplished to near motional ground state of the atomic object (e.g., to temperatures significantly below the Doppler cooling limit) with lower laser power requirements than resolved sideband cooling and in a less technically complex manner than conventional EIT cooling. Moreover, in various embodiments, the first and second manipulation sources used to generate and/or provide the first and second manipulation signals may be used to also perform Doppler cooling. Thus, various embodiments enable the use of both Doppler cooling and EIT cooling without requiring additional lasers or other manipulation sources. As such, various embodiments provide technical improvements over conventional laser cooling of atomic objects comprising first components having low lying D manifolds.

Additionally, the detunings of various embodiments are less than conventional detunings of conventional EIT cooling operations, which enables the simultaneous cooling of multiple modes of the atomic object. For example, in various embodiments, by adjusting the first and second detunings (while maintaining the first and second detunings being substantially equal to one another, in various embodiments) along with the intensities of the first and second manipulation signals, an optimal set of parameters may be determined for the atomic object that enables a large range of crystal modes of the atomic object with different frequencies (e.g., varying between ~1 MHz and ~3 MHz) to be simultaneously cooled. For example, various embodiments provide the additional advantage of enabling the broadband cooling of multiple modes of the atomic object that have different mode frequencies (e.g., frequencies ranging over 1-3 MHz) simultaneously.

FIG. 2A provides a partial level diagram of an example first component of an atomic object (e.g., a cooling ion) illustrating an example EIT cooling operation, in accordance with various embodiments. The partial level diagram illustrates an S manifold 210. In various embodiments, the EIT cooling operation makes use of one or more states of the S manifold 210 (e.g., one or two states of the S manifold). The partial level diagram also illustrates a P manifold 220. In various embodiments, the EIT cooling operation makes use of one or more states of the P manifold 220 (e.g., one or two states of the P manifold). The partial level diagram further illustrates a low lying D manifold 230. In various embodiments, the EIT cooling operation makes use of one or more states of the D manifold 230 (e.g., one, two, three, or four states of the D manifold).

FIG. 2B provides a partial level diagram of an example first component of an atomic object (e.g., a cooling ion) illustrating another example EIT cooling operation, in accordance with various embodiments. The partial level diagram shown in FIG. 2B includes the same S manifold 210, P manifold 220, and low lying D manifold 230 illustrated in FIG. 2A as the diagram corresponds to the energy levels of the same cooling ion, for example. However, the polarization of the first manipulation signal 215' used to couple the S manifold 210 to the P manifold 220 is σ-polarized in FIG. 2B, rather than π-polarized as shown in FIG. 2A.

Performance of an EIT cooling operation of various embodiments comprises application of a first manipulation signal 215, 215' and a second manipulation signal 225, 225' to an atomic object. In an example embodiment, the first manipulation signal 215 is characterized by a first wavelength $\lambda_1$ and is π-polarized, as illustrated in FIG. 2A. In another example embodiment, as illustrated in FIG. 2B, the first manipulation signal 215' is characterized by the first wavelength $\lambda_1$ and is σ-polarized. The first wavelength $\lambda_1$ corresponds to the transition between the S manifold 210 and the P manifold 220. In various embodiments, the first wavelength $\lambda_1$ corresponds to the resonant frequency of the transition between the S manifold 210 and the P manifold 220 and is detuned therefrom by a first detuning $\Delta_{SP}$.

In an example embodiment, the second manipulation signal 225, 225' is characterized by a second wavelength $\lambda_2$ and is σ-polarized. For example, the second manipulation signal 225 is linearly polarized in a direction perpendicular to the magnetic field ($\sigma^{+/-}$-polarized). The second wavelength $\lambda_2$ corresponds to the transition between the P manifold 220 and the D manifold 230. In various embodiments, the second wavelength $\lambda_2$ corresponds to the resonant frequency of the transition between the P manifold 220 and the D manifold 230 and is detuned therefrom by a second detuning $\Delta_{PD}$.

In various embodiments, the first and second detunings are substantially equivalent to one another (e.g., $\Delta_{SP} \approx \Delta_{PD}$), when measured with respect to a particular set of three levels, one each from the S-, D-, and P-manifolds. In an example embodiment, the first component of an atomic object is singly ionized Ba, the first wavelength $\lambda_1 \approx 493$ nm, the second wavelength $\lambda_2 \approx 650$ nm, and the first and second detunings $\lambda_{SP} \approx 20$ MHz$\approx \Delta_{PD}$. In various embodiments, the frequency of the first manipulation signal 215, 215' and the frequency of the second manipulation signal 225, 225' are stabilized with respect to one another within a tolerance $\Delta\omega/(2\pi) \leq 100$ kHz. As should be understood, various other polarization schemes, wavelengths, and detunings are used in various other embodiments based on the energy structure of the first component of the atomic object and the selected dark state.

As used herein the term dark state refers to a coherent superposition of two states formed by the appropriate two-photon transition. For the embodiments illustrated in FIGS. 2A and 2B, the respective dark state is formed by a superposition of a state in the S manifold and a state in the D manifold that are coupled via the first manipulation signal 215, 215' and the second manipulation signal 225, 225'.

As should be understood, as used herein, a transition between a first manifold and second manifold (e.g., the S manifold and the P manifold, the P manifold and the D manifold) indicates a transition between a state of the first manifold and a state of the second manifold. As used herein, a manifold of states refers to a group of states with the same total angular momentum, with each manifold comprising multiple states differing in energy by Zeeman splittings due to an applied magnetic field. The total angular moment of a state corresponds to the sum of the spin angular moment and the orbital angular momentum of the state (which includes nuclear angular momentum via the hyperfine coupling when the nuclear angular momentum is non-zero).

In various embodiments, the S-to-P-to-D EIT cooling operation involves a Zeeman state of the $S_{1/2}$ manifold 210, a Zeeman state of the $P_{1/2}$ manifold 220, and a Zeeman state of the $D_{3/2}$ manifold 230. In an example embodiment, the S-to-P-to-D EIT cooling operation involves states and/or manifolds that tend to be used for Doppler cooling. Thus, for a system configured to perform Doppler cooling, the same manipulation sources may be easily repurposed for use in an example embodiment of the S-to-P-to-D EIT cooling operation. At a finite magnetic field and fixed frequency of the second manipulation signal 225, 225' (e.g., fixed wavelength $\lambda_2$), scanning the frequency of the first manipulation signal 215, 215' reveals four dark-state resonances associated with two-photon resonant transitions from the $S_{1/2}$ manifold 210 to the $D_{3/2}$ manifold 230. A dark state is a state of an atomic object and/or a component of an atomic object that cannot absorb or emit photons. When the first wavelength $\lambda_1$ of the first manipulation signal 215, 215' and the second wavelength $\lambda_2$ of the second manipulation signal 225, 225' are tuned to one of these two-photon resonances, EIT cooling is achieved when the scattering rate on the blue side (e.g., on the shorter wavelength, higher frequency side) of the two-photon resonance is less than the scattering on the red side (e.g., on the longer wavelength, lower frequency side) of the two-photon resonance, by causing a preferential scattering on the red-sideband transitions that remove motional energy from the atomic object and/or first component of the atomic object (e.g., cooling ion).

In FIG. 2A, an example two-photon resonance consisting of the $m_j=1/2$ state of the $S_{1/2}$ manifold 210 and the $m_j=3/2$ state of the $D_{3/2}$ manifold 230, which can be used in an S-to-P-to-D EIT cooling operation of an example embodiment, is shown via the coupling by the first manipulation signal 215 shown as a solid line and the second manipulation signal 225 shown as a solid line.

The frequency width of the two-photon resonance depends on the single photon detuning from the states of the $P_{1/2}$ manifold (e.g., $\Delta_{SP}$, $\Delta_{PD}$). For example, when the first and/or second detunings are decreased, the width of the two-photon resonance becomes broader, and when the first and/or second detunings are increased, the width of the two-photon resonance becomes narrower. A narrower frequency width of the two-photon resonance provides faster cooling to lower temperatures (compared to a broad frequency width of the two-photon resonance), while a broader frequency width of the two-photon resonance provides a broader cooling bandwidth (compared to a narrow frequency width of the two-photon resonance).

In various embodiments, the first detuning $\Delta_{SP}$ and the second detuning $\Delta_{PD}$ are set to a detuning in the range of 10-450 MHz. For example, in an example embodiment, $\Delta_{SP}=\Delta_{PD}$ 20 MHz, which provides a cooling bandwidth sufficiently large to efficiently cool many motional modes of an atomic object (e.g., an ion crystal such as an ion crystal comprising four ions), while still maintaining cooling speeds and final temperatures that are sufficient for various applications, including cooling of atomic objects confined within an atomic object confinement apparatus of a quantum computer where the atomic objects comprise qubit ions for use as the qubits of the quantum computer.

In various embodiments, the first and second detunings $\Delta_{SP}=\Delta_{PD}$ are less than the conventional detunings used in conventional EIT cooling operations. The smaller first and second detunings of various embodiments (compared to conventional detunings of conventional EIT cooling operations) enables the simultaneous cooling of multiple modes of the atomic object. For example, in various embodiments, by adjusting the first and second detunings (while maintaining $\Delta_{SP}=\Delta_{PD}$, in various embodiments) along with the intensities of the first and second manipulation signals, an optimal set of parameters may be determined for the atomic object that enables a large range of crystal modes of the atomic object with different frequencies (e.g., varying between ~1 MHz and ~3 MHz) to be simultaneously cooled. For example, various embodiments, enable the cooling of multiple modes of the atomic object that have different mode frequencies (e.g., frequencies ranging over 1-3 MHz) simultaneously.

In various embodiments, the efficiency of various embodiments of S-to-P-to-D EIT cooling operations is improved when the first and second wavelengths $\lambda_1$, $\lambda_2$ characterizing the first and second manipulations signals, respectively, are relatively stable with respect to one another. In an example embodiment, the first manipulation source and the second manipulation source are configured such that the first wavelength $\lambda_1$ and the second wavelength $\lambda_2$ are independently stabilized such that their frequency difference is stabilized to a tolerance of ≤100 kHz. For example, the relative stabilization of the first and second wavelengths is performed by independently stabilizing the first and second manipulation sources 64A, 64B, in an example embodiment. In various embodiments, the stabilization of the first and/or second manipulation source 64A, 64B and/or the stabilization of the first and/or second wavelengths is accomplished by using a resonance cavity, coupling the first and second manipulation signals to a frequency comb, an example of which is described in U.S. Pat. No. 10,951,002, issued Mar. 16, 2021 (the content of which is hereby incorporated by reference herein in its entirety); using a servo and/or feedback loop, and/or the like.

FIG. 3A illustrates one example geometry for performing an S-to-P-to-D EIT cooling operation of the example embodiment illustrated in FIG. 2A. FIG. 3A shows an atomic object 308 located and/or disposed in particular region 55 of the atomic object confinement apparatus 50. The atomic object 308 comprises two first components 310 and two second components 312. The first components 310 are of a first atomic type and the second components 312 are of a second atomic type, the first atomic type and the second atomic type are different. For example, in an example embodiment, the first components 310 are singly ionized Ba atoms and the second components 312 are singly ionized Yb atoms. The first and second components 310, 312 are aligned along and/or disposed so as to define an atomic object axis 305. In an example embodiment, the atomic object axis 305 is substantially parallel to a radio frequency null 350 of the particular region 55 of the atomic object confinement apparatus 50. The radio frequency null 350 is the zero-point line of a pseudopotential generated by applying a radio frequency voltage signal to radio frequency electrodes and/or rails of the atomic object confinement apparatus 50.

In various embodiments, a magnetic field B is generated such that in the particular region 55 the magnetic field B has a finite and substantially stable (e.g., not changing with time) amplitude (e.g., 2-10 Gauss and/or 5 Gauss in an example embodiment). In various embodiments, the magnetic field B in the particular region 55 has a magnetic field direction that forms an angle α with the atomic object axis 305. In an example embodiment, the angle α is in a range of 30 to 60 degrees. In an example embodiment, the angle α is approximately 45 degrees.

In various embodiments, the first manipulation signal 215 has a polarization 218 (e.g., π-polarization). In an example embodiment, the polarization 218 of the first manipulation signal 215 is substantially parallel to the magnetic field direction. In various embodiments, the first propagation direction is transverse to the atomic object axis 305. In an example embodiment, the first manipulation signal 215 propagates in a first propagation direction that forms an angle β with the atomic object axis 305. In various embodiments, the angle β is configured such that the propagation of the first manipulation signal 215 is not parallel or anti-parallel to the magnetic field direction. In various embodiments, the angle β is in a range of 30 to 60 degrees. In an example embodiment, the angle β is approximately 45 degrees.

In various embodiments, the second manipulation signal 225 has a polarization 228 (e.g., $\sigma^{+/-}$-polarization). In an example embodiment, the polarization 228 of the second manipulation signal 225 is transverse to the magnetic field direction. In various embodiments, the second propagation direction is transverse to the atomic object axis 305. In an example embodiment, the second manipulation signal 225 propagates in a second propagation direction that forms an angle γ with the atomic object axis 305. In various embodiments, the angle γ is in a range of 0 to 90 degrees. In an example embodiment, the angle γ is approximately 45 degrees.

In various embodiments, the first propagation direction is substantially anti-parallel to the second propagation direction. In various embodiments, both the first propagation direction and the second propagation are transverse to the magnetic field direction. In an example embodiment, the first propagation direction and the second propagation direction are substantially perpendicular to the magnetic field direction.

FIG. 3B illustrates another example geometry for performing an S-to-P-to-D EIT cooling operation such as the example embodiment illustrated in FIG. 2B. FIG. 3B shows an atomic object 308 located and/or disposed in particular region 55 of the atomic object confinement apparatus 50. The atomic object 308 comprises two first components 310 and two second components 312. The first components 310 are of a first atomic type and the second components 312 are of a second atomic type, the first atomic type and the second atomic type are different. For example, in an example embodiment, the first components 310 are singly ionized Ba atoms and the second components 312 are singly ionized Yb atoms. The first and second components 310, 312 are aligned along and/or disposed so as to define an atomic object axis 305. In an example embodiment, the atomic object axis 305 is substantially parallel to a radio frequency null 350 of the particular region 55 of the atomic object confinement apparatus 50.

In various embodiments, a magnetic field B is generated such that in the particular region 55 the magnetic field B has a finite and substantially stable (e.g., not changing with time) amplitude (e.g., 2-10 Gauss and/or 5 Gauss in an example embodiment). In various embodiments, the magnetic field B in the particular region 55 has a magnetic field direction that forms an angle α' with the atomic object axis 305. In an example embodiment, the angle α' is in a range of 0 to 360 degrees. In an example embodiment, the angle α' is approximately 45 degrees. In particular, the magnetic field direction is substantially not parallel or anti-parallel to the polarization 228' of the second manipulation signal 225'. In various embodiments, the magnetic field B is substantially parallel to the plane defined by the atomic object confinement apparatus.

In various embodiments, the first manipulation signal 215' has a first polarization 218' (e.g., $\sigma^{+/-}$-polarization). In an example embodiment, the first polarization 218' of the first manipulation signal 215' is substantially not parallel and/or is transverse to the magnetic field direction. In an example embodiment, the first polarization 218' is perpendicular to the magnetic field direction. In various embodiments, the first propagation direction is transverse to the atomic object axis 305. In an example embodiment, the first manipulation signal 215' propagates in a first propagation direction that forms an angle β' with the atomic object axis 305. In various embodiments, the angle β' is in a range of 0 to 90 degrees. In an example embodiment, the angle β' is approximately 45 degrees. In an example embodiment, the angle β' is approximately 90 degrees.

In various embodiments, the second manipulation signal 225' has a second polarization 228' (e.g., $\sigma^{+/-}$-polarization). In an example embodiment, the second polarization 228' of the second manipulation signal 225' is transverse to the magnetic field direction. In an example embodiment, the second polarization 228' is perpendicular to the magnetic field direction. In various embodiments, the second propagation direction is transverse to the atomic object axis 305. In an example embodiment, the second manipulation signal 225' propagates in a second propagation direction that forms an angle γ with the atomic object axis 305. In various embodiments, the angle γ is in a range of 30 to 60 degrees. In an example embodiment, the angle γ is approximately 45 degrees.

In various embodiments, the first propagation direction is substantially anti-parallel to the second propagation direction. In the illustrated embodiment, the first propagation direction and the second propagation direction are substantially anti-parallel with respect to one another (e.g., (β'≈γ').

In various embodiments, the difference between the first propagation direction $\widehat{k_1}$ (a unit vector in the direction of the wavevector of a respective first manipulation signal 215, 215') and the second propagation direction $\widehat{k_2}$ (a unit vector in the direction of the wavevector of a respective second manipulation signal 225, 225') has a non-zero projection on the direction of the motion to be cooled. For example, when the mode of the atomic object 308 to be cooled is an axial mode (e.g., corresponds to motion along the atomic object axis 305), $\hat{i} \cdot \widehat{\Delta k} \neq 0$, where $\hat{i}$ is a unit vector along the atomic object axis 305 and $\widehat{\Delta k} = \widehat{k_1} - \widehat{k_2}$. In another example, when the mode of the atomic object 308 to be cooled is a radial mode (e.g., corresponds to motion orthogonal to the atomic object axis 305), $\hat{j} \cdot \widehat{\Delta k} \neq 0$, where $\hat{j}$ is a radial unit vector (e.g., $\hat{i} \cdot \hat{j} = 0$) and $\widehat{\Delta k} = \widehat{k_1} - \widehat{k_2}$.

FIGS. 3A and 3B illustrate two example geometries for performing an S-to-P-to-D EIT cooling operation of an example embodiment. As should be understood, other geometries may be used in various other embodiments. For example, in an example embodiment, the magnetic field direction may be parallel or anti-parallel to the atomic object axis 305. In an example embodiment, the first propagation direction and the second propagation direction are each parallel to the atomic object axis 305. In various embodiments, the magnetic field direction is transverse to both the first and second propagation directions. In various embodiments, the magnetic field direction, first propagation direction, and/or second propagation may be transverse to the plane defined by the atomic object confinement apparatus.

In general, the S-to-P-to-D EIT cooling operation may be performed using a first manifold, a second manifold, and a third manifold where the first, second, and third manifolds are each distinct fine-structure manifolds, the first and second manifolds are lower energy manifolds, and the first and second manifolds can both be coupled to the third (higher energy) manifold via dipole transitions. The illustrated embodiments show the scenario where the first manifold is the S manifold, the second manifold is the D manifold, and the third manifold is the P manifold.

Example Clock State EIT Cooling Operation

Various embodiments provide quantum computers, systems, apparatuses, and/or the like and corresponding methods for performing EIT cooling using clock states of a first component of an atomic object.

Previously, EIT cooling of ions having a 171Yb⁺-like energy structure (e.g., similar fine and/or hyperfine energy structure to a singly ionized 171Yb atom) worked by coupling multiple F=1 states to an excited manifold. For example, the $S_{1/2}$, F=1, m=+1 state of the ground manifold would be coupled to the $S_{1/2}$, F=1, m=0 state of the ground manifold via coupling to the $P_{1/2}$, F=0, m=0 state. However, the coupling of the $S_{1/2}$, F=1, m=+1 state to the $P_{1/2}$, F=0, m=0 state requires σ-polarization while the coupling of the $S_{1/2}$, F=1, m=0 state to the $P_{1/2}$, F=0, m=0 requires π-polarization, thereby requiring certain orientations of the magnetic field with respect to the propagation directions. Additionally, ions may become "stuck" in the $S_{1/2}$, F=0, m=0 state and must be repumped into the $S_{1/2}$, F=1 manifold, requiring an additional manipulation signal coupling the $S_{1/2}$, F=0 manifold to the P manifold. Thus, conventional EIT cooling requires a high degree of technical complexity to effectively cool an atomic object having a first component that has a 171Yb⁺-like energy structure. Moreover, resolved sideband cooling would require high-bandwidth control capabilities beyond those required for EIT, thereby requiring additional technical complexity if one wants to use both cooling methods. Thus, technical problems exist as to how to efficiently, effectively, and robustly cool atomic objects to near their motional ground state.

Various embodiments provide technical solutions to these technical problems. In various embodiments, an EIT cooling operation is performed using a first manipulation signal that couples a first clock state in the S manifold of the first component of the atomic object to one or more states of the P manifold and a second manipulation signal that couples the second clock state in the S manifold of the first component of the atomic object to the one or more states of the P manifold. The first clock state in the S manifold of the first component of the atomic object is the F=1, m=0 state and the second clock state in the S manifold of the first component of the atomic object is the F=0, m=0 state, in various embodiments. The first and second clock states are substantially less susceptible to environmental changes compared to the F=1, m=+/−1 states. In various embodiments, both the first manipulation signal and the second manipulation signal are detuned above the one or more states of the P manifold to establish a dark state associated with a two photon transition between the first clock state in the S manifold and the second clock state in the S manifold.

By coupling the first and second clock states in the S manifold in order to produce a dark state, efficient cooling can be accomplished to near motional ground state of the atomic object (e.g., to temperatures significantly below the Doppler cooling limit) with lower laser power requirements than resolved sideband cooling and in a less technically complex manner than conventional EIT cooling. Moreover, in various embodiments, the first and second manipulation sources used to generate and/or provide the first and second manipulation signals may be used to also perform sideband cooling of the first component of the atomic object. Thus, various embodiments enable the use of both sideband cooling and EIT cooling without requiring additional lasers or other manipulation sources.

Additionally, the efficacy of various embodiments of the clock state EIT cooling operation is insensitive to the relative alignment of the magnetic field and the first and second manipulation signals. Thus, various embodiments provide the additional technical advantage of providing efficient cooling without necessitating strict requirements regarding the relative alignment of the magnetic field and the first and second manipulation signals.

Moreover, the detunings of various embodiments are less than conventional detunings of conventional EIT cooling operations, which enables the simultaneous cooling of multiple modes of the atomic object. For example, various embodiments provide the additional advantage of enabling the broadband cooling of multiple modes of the atomic object that have different mode frequencies (e.g., frequencies ranging over 1-3 MHz) simultaneously. As such, various embodiments provide technical improvements over conventional laser cooling of atomic objects.

FIG. 4 provides a partial level diagram of an example first component of an atomic object (e.g., a cooling ion) illustrating an example EIT cooling operation, in accordance with various embodiments. The partial level diagram illustrates an S manifold 410. In various embodiments, the EIT cooling operation makes use of two clock states of the S manifold 410 (e.g., the m=0 states of the S manifold). The partial level diagram also illustrates a P manifold 420. In various embodiments, the EIT cooling operation makes use of one or more states of the P manifold 420. The partial level diagram further illustrates first and second manipulation signals 415, 425 that are blue detuned from the P manifold 420 with respect to the transitions between the respective clock state and a state of the P manifold 420.

Performance of an EIT cooling operation of various embodiments comprises application of a first manipulation signal 415 and a second manipulation signal 425 to an atomic object. In an example embodiment, the first manipulation signal 415 is characterized by a first wavelength $\lambda_A$ and that has a first polarization. The first wavelength $\lambda_A$ corresponds to the transition between the first clock state 412 of the S manifold 410 and the P manifold 420. In various embodiments, the first wavelength $\lambda_A$ corresponds to the resonant frequency of the transition between the first clock state 412 of the S manifold 410 and the P manifold 420 and is detuned therefrom by a first detuning $\Delta_A$.

In an example embodiment, the second manipulation signal 425 is characterized by a second wavelength $\lambda_B$ and has a second polarization. The second wavelength $\lambda_B$ corresponds to the transition between the second clock state 414 of the S manifold 410 and the P manifold 420. In various embodiments, the second wavelength $\lambda_B$ corresponds to the resonant frequency of the transition between the second clock state 414 of the S manifold 410 and the P manifold 420 and is detuned therefrom by a second detuning $\Delta_B$.

In various embodiments, the first and second detunings are substantially equivalent to one another (e.g., $\Delta_A \approx \Delta_B$), when measured with respect to a particular set of three levels. In an example embodiment, the first component of an atomic object is singly ionized Yb, the first wavelength $\lambda_A \approx 369.5$ nm (e.g., 369.5193 nm), the second wavelength $\lambda_2 \approx 369.5$ nm (e.g., 369.5251 nm), and the first and second detunings $\Delta_A \approx 30\text{-}450$ MHz $\approx \Delta_B$. In an example embodiment, $\Delta_A \approx 55$ MHz $\approx \Delta_B$. As should be understood, various other polarization schemes, wavelengths, and detunings are used in various other embodiments based on the energy structure of the first component of the atomic object and the selected dark state. In various embodiments, the detunings $\Delta_A \approx \Delta_B$ may be adjusted during the performance of a clock state EIT operation in order to cool different (crystal) motional modes of the atomic object. In various embodiments, multiple modes of the atomic object, including modes of the atomic object that have different mode frequencies (e.g., frequencies ranging over 1-3 MHz), may be cooled simultaneously.

In various embodiments, the first polarization and the second polarization are transverse to one another. For example, in an example embodiment where the first polarization and second polarization are linear polarizations, the first direction along which the first polarization is aligned and the second direction along which the second polarization is aligned are transverse to one another. For example, in an example embodiment, an orthogonal coordinate system is definable such that the first manipulation signal is propagating in a positive z-direction and the first polarization is aligned with the x-direction and the second manipulation signal is propagating in the negative z-direction and the second polarization is aligned with the y-direction. In various embodiments, the first polarization and the second polarization may be linear or circular polarizations.

As should be understood, as used herein, a transition between a first manifold and second manifold (e.g., the $S_{1/2}$, F=1 manifold and the $P_{1/2}$, F=1 manifold, the $P_{1/2}$, F=1 manifold and the $S_{1/2}$, F=1 manifold) indicates a transition between a state of the first manifold and a state of the second manifold. As used herein with respect to the clock state EIT cooling operation, a manifold of states refers to a particular hyperfine level, with each manifold comprising multiple states differing in energy by Zeeman splittings due to an applied magnetic field.

The frequency width of the two-photon resonance depends on the single photon detuning from the states of the $P_{1/2}$ manifold (e.g., $\Delta_A$, $\Delta_B$). For example, when the first and/or second detunings are decreased, the width of the two-photon resonance becomes broader, and when the first and/or second detunings are increased, the width of the two-photon resonance becomes narrower. A narrower frequency width of the two-photon resonance provides faster cooling to lower temperatures (compared to a broad frequency width of the two-photon resonance), while a broader frequency width of the two-photon resonance provides a broader cooling bandwidth (compared to a narrow frequency width of the two-photon resonance). Various embodiments provide broadband EIT cooling through the use of varying the smaller than conventional detunings and varying the intensity of the first and second manipulation signals to enable the simultaneous cooling of multiple atomic object modes, including modes of the atomic object that have different mode frequencies (e.g., frequencies ranging over 1-3 MHz).

In various embodiments, the first detuning $\Delta_A$ and the second detuning $\Delta_B$ are set to a detuning in the range of 30-450 MHz. For example, in an example embodiment, $\Delta_A = \Delta_B$ 55 MHz, which provides a cooling bandwidth sufficiently large to efficiently cool the motional modes of an atomic object (e.g., an ion crystal such as an ion crystal comprising four ions), while still maintaining cooling speeds and final temperatures that are sufficient for various applications, including cooling of atomic objects confined within an atomic object confinement apparatus of a quantum computer where the atomic objects comprise qubit ions for use as the qubits of the quantum computer.

In various embodiments, the efficiency of various embodiments of clock state EIT cooling operations is improved when the first and second wavelengths $\lambda_A$, $\lambda_B$ characterizing the first and second manipulations signals, respectively, are relatively stable with respect to one another. In an example embodiment, the first manipulation source and the second manipulation source are configured such that the first wavelength and the second wavelength are independently stabilized. In an example embodiment, the first manipulation signal and the second manipulation signal are generated by the same manipulation source 64 such that the respective wavelengths of the two manipulation signals are substantially stable with respect to one another.

In FIG. 4, an example two-photon resonance consisting of the m=0 states (e.g., clock states 412, 414) of the $S_{1/2}$ manifold 410 and a state of the $P_{1/2}$ manifold 420, which can be used in a clock state EIT cooling operation of an example embodiment is shown via the coupling by the first manipulation signal 415 shown as a solid line and the second manipulation signal 425 shown as a solid line.

FIG. 4 also illustrates the optical pumping of atomic objects out of the Zeeman states 416A, 416B (m=+/−1) of the S manifold 10 by the first manipulation signal 415. In various embodiments, spontaneous decay of atomic objects out of the P manifold 420 can lead to populating the uncoupled Zeeman (e.g., m=+/−1) states 416A, 416B of the S manifold 410. However, the application of the first manipulation signal 415 and the second manipulation signal 425 to the atomic object will also remove population from these uncoupled Zeeman states 416A, 416B, as shown by dashed transition lines 450. For example, application of the first manipulation signal 415 to the atomic object optically pumps the atomic objects in the uncoupled Zeeman (e.g., m=+/−1) states 416A, 416B back to the clock states 412, 414. As a result, any atomic object that leaks from the dark state cooling cycle (e.g., comprising the clock states 412, 414, and one or more states of the P manifold 420) will quickly be returned through this optical pumping process.

In an example embodiment, the first manipulation signal 415 is generated and/or provided by a first manipulation source 64A and the second manipulation signal 425 is generated and/or provided by second manipulation source 64B, where the first manipulation source 64A and the second manipulation source 64B are different manipulation sources. In an example embodiment, the first manipulation signal 415 and the second manipulation signal 425 are generated by a same manipulation source (e.g., same laser). For example, in an example embodiment, the first manipulation source and the second manipulation source are the same manipulation source or are overlapping manipulation sources (e.g., comprise the same laser but may include different optical components for preparing the respective manipulation signal).

FIG. 5 illustrates one example geometry for performing a clock state EIT cooling operation of an example embodiment. FIG. 5 shows an atomic object 508 located and/or disposed in particular region 55 of the atomic object confinement apparatus 50. The atomic object 508 comprises two first components 510 and two second components 512. The first components 510 are of a first atomic type and the second components 512 are of a second atomic type, the first atomic type and the second atomic type are different. For example, in an example embodiment, the first components 510 are singly ionized Yb atoms and the second components 512 are singly ionized Ba atoms. The first and second components 510, 512 are aligned along and/or disposed so as to define an atomic object axis 505. In an example embodiment, the atomic object axis 505 is substantially parallel to a radio frequency null 550 of the particular region 55 of the atomic object confinement apparatus 50. The radio frequency null 550 is the zero-point line of a pseudopotential generated by applying a radio frequency voltage signal to radio frequency electrodes and/or rails of the atomic object confinement apparatus 50.

In various embodiments, a magnetic field B is generated such that in the particular region 55 the magnetic field B has a finite and substantially stable (e.g., not changing with time) amplitude (e.g., 2-10 Gauss and/or 5 Gauss in an example embodiment). In various embodiments, the magnetic field B in the particular region 55 has a magnetic field direction that forms an angle θ with the atomic object axis 505. In an example embodiment, the angle θ is in a range of 0 to 90 degrees or in a range of 180-270. In an example embodiment, the angle θ is approximately 45 degrees.

In various embodiments, the magnetic field direction is not substantially parallel or anti-parallel to the direction of propagation of the first manipulation signal 415. In various embodiments, the efficiency of the clock state EIT cooling operation is not dependent on the relative angles between the first and second manipulation signals 415, 425 and the magnetic field direction as long as the magnetic field direction is not substantially parallel or anti-parallel to the polarization 418 of the first manipulation signal 415.

In various embodiments, the first manipulation signal 415 has a first polarization 418 (e.g., a linear polarization in the illustrated embodiment). In an example embodiment, the polarization 418 of the first manipulation signal 415 is transverse to the magnetic field direction.

In various embodiments, the first manipulation signal 415 propagates in a first propagation direction that is transverse to the atomic object axis 505. In an example embodiment, the first manipulation signal 415 propagates in a first propagation direction that forms an angle φ with the atomic object axis 505. In various embodiments, the angle φ is in a range of 0 to 90 degrees. In an example embodiment, the angle φ is approximately 45 degrees.

In various embodiments, the second manipulation signal 425 has a second polarization 428 (e.g., a linear polarization in the illustrated embodiment). In an example embodiment, the second polarization 428 of the second manipulation signal 425 is transverse to both the magnetic field direction and the first polarization 418.

In various embodiments, the second manipulation signal 425 propagates in a second propagation direction that is transverse to the atomic object axis 505. In an example embodiment, the second manipulation signal 425 propagates in a second propagation direction that forms an angle ψ with the atomic object axis 505. In various embodiments, the angle ψ is in a range of 90 to 180 degrees. In an example embodiment, the angle ψ is approximately 135 degrees.

In various embodiments, the first propagation direction is transverse or anti-parallel to the second propagation direction. In general, the first propagation direction and the second propagation direction are substantially not parallel (e.g., are transverse or anti-parallel to one another). In the illustrated embodiment, the first propagation direction and the second propagation direction are substantially anti-parallel with respect to one another (e.g., φ+ψ=180°. In various embodiments, φ+ψ is in the range of 135 to 225 degrees.

In various embodiments, the difference between the first propagation direction $\widehat{k_1}$ (a unit vector in the direction of the wavevector of a respective first manipulation signal 415) and the second propagation direction $\widehat{k_2}$ (a unit vector in the direction of the wavevector of a respective second manipulation signal 425) has a non-zero projection on the direction of the motion to be cooled. For example, when the mode of the atomic object 508 to be cooled is an axial mode (e.g., corresponds to motion along the atomic object axis 505), $\hat{i} \cdot \widehat{\Delta k} \neq 0$, where $\hat{i}$ is a unit vector along the atomic object axis 505 and $\widehat{\Delta k} = \widehat{k_1} - \widehat{k_2}$. In another example, when the mode of the atomic object 508 to be cooled is a radial mode (e.g., corresponds to motion orthogonal to the atomic object axis 505), $\hat{j} \cdot \widehat{\Delta k} \neq 0$, where $\hat{j}$ is a radial unit vector (e.g., $\hat{i} \cdot \hat{j} = 0$) and $\widehat{\Delta k} = \overline{k_1} - \overline{k_2}$.

FIG. 5 illustrates an example geometry for performing a clock state EIT cooling operation of an example embodiment. As should be understood, other geometries may be used in various other embodiments. For example, in an example embodiment, the magnetic field direction may be parallel or anti-parallel to the atomic object axis 505. In an example embodiment, the first propagation direction and the second propagation direction are each parallel to the atomic object axis 505. In various embodiments, the magnetic field direction, first propagation direction, and/or second propagation may be transverse to the plane defined by the atomic object confinement apparatus.

Example Method of Performing an EIT Cooling Operation

FIG. 6 provides a flowchart illustrating various processes, procedures, and/or the like for performing an S-to-P-to-D EIT cooling operation and/or a clock state EIT cooling operation, in accordance with various embodiments. The example embodiment shown in FIG. 6 corresponds to the performance of an S-to-P-to-D EIT cooling operation and/or a clock state EIT cooling operation by a QCCD-based quantum computer, such as quantum computer 110. In various embodiments, the processes, procedures, and/or the like illustrated in FIG. 6 are performed by a controller 30 of the quantum computer 110.

Starting at step/operation 602, the controller 30 causes the quantum computer 110 to begin performance and/or execution of a quantum circuit. For example, the controller 30 may control voltage sources of the quantum computer 110, manipulation sources 64, magnetic field generator 70, and/or the like to cause the quantum computer 110 to perform a controlled quantum state evolution of qubit ions of atomic objects confined by the atomic object confinement apparatus 50.

At step/operation 604, the controller 30 determines that a cooling trigger has been identified. For example, as the controller 30 controls the quantum computer 110 and/or components thereof, the controller 30 determines that a cooling trigger has been identified. In an example embodiment, the cooling trigger is identified in response to performing a transport operation (e.g., a linear transport, transport through a junction of a two-dimensional atomic object confinement apparatus, re-ordering of components within an atomic object, combining atomic objects, splitting atomic objects, swapping atomic objects, and/or the like) and determining that excess heat gained during the transport operation is to be removed from the atomic object. In an example embodiment, the cooling trigger is identified in preparation for the performance of a quantum gate. In various embodiments, a variety of actions and/or planned actions may cause the controller 30 to determine that a cooling trigger has been identified. In various embodiments, the cooling trigger indicates that particular region 55 of the atomic object confinement apparatus 50 in which the cooling operation is to be performed.

At step/operation 606, the controller 30 controls the magnetic field generator 70 to generate a magnetic field in the particular region 55 having a magnetic field direction and a particular amplitude. In an example embodiment, the magnetic field generator 70 is a permanent magnet and the controller 30 need not control the magnetic field generator 70. In an example embodiment, the magnetic field generator 70 is configured to generate and/or maintain a substantially stable magnetic field having a magnetic field direction and a particular amplitude throughout the operation of the quantum computer 110 and/or the performance of a quantum circuit and/or algorithm. Thus, the controller 30 controls the magnetic field generator 70 to maintain the magnetic field in the particular region 55 having the magnetic field direction and the particular amplitude, in an example embodiment.

At step/operation 608, the controller 30 controls the first manipulation source 64A to generate and provide a first manipulation signal 215, 415 to the particular region 55 and controls the second manipulation source 64B to generate and provide a second manipulation signal 225, 425 to the particular region 55.

In various embodiments, the EIT cooling operation is an S-to-P-to-D EIT cooling operation and the first manipulation signal 215 is characterized by a first wavelength $\lambda_1$ corresponding to a transition between an S manifold and a P manifold of a first component 310 of the atomic object 308 and detuned from the transition between the S manifold and the P manifold by a first detuning $\Delta_{SP}$. In various embodiments, the second manipulation signal 225 is characterized by a second wavelength $\lambda_2$ corresponding to a transition between the P manifold and a D manifold of the first component 310 of the atomic object 308 and detuned from the transition between P manifold and the D manifold by a second detuning $\Delta_{PD}$.

In various embodiments, the EIT cooling operation is a clock state EIT cooling operation and the first manipulation signal 415 is characterized by a first wavelength $\lambda_A$ corresponding to a transition between a first clock state 412 of the S manifold and a P manifold of a first component 510 of the atomic object 408 and detuned from the transition between the first clock state 412 and the P manifold 420 by a first detuning $\Delta_A$. In various embodiments, the second manipulation signal 425 is characterized by a second wavelength corresponding to a transition between the second clock state 414 of the S manifold 410 and a P manifold 420 of the first component 510 of the atomic object 508 and detuned from the transition between the second clock state 414 and the P manifold 420 by a second detuning $\Delta_B$.

In various embodiments, the first and second detunings correspond to (e.g., are tuned to and/or determined based on) a (selected) dark state associated with a two-photon transition between the S manifold and the D manifold, in the case of an S-to-P-to-D EIT cooling operation, or between the first clock state 412 and the second clock state 414, in the case of a clock state EIT cooling operation. In various embodiments, the first and second manipulation signals 215, 415, 225, 425 are provided such that the atomic object disposed in the particular region 55 has both the first and second manipulation signals incident thereon in a time overlapping manner. For example, for at least some period of time, both the first and second manipulations signals are simultaneously incident on the atomic object disposed in the particular region 55.

In various embodiments, prior to performing the S-to-P-to-D EIT cooling operation or clock state EIT cooling operation, a Doppler cooling operation is performed. For example, in an example embodiment, in response to determining that the cooling trigger was identified, a Doppler cooling operation is performed followed by performance of an S-to-P-to-D EIT cooling operation or clock state EIT cooling operation, as appropriate for the atomic object and/or components thereof. In an example embodiment, the cooling trigger is identified in response to determining that a Doppler cooling operation has been performed in the particular region 55 until the atomic object(s) disposed in the particular region 55 has reached the Doppler limit.

At step/operation 610, the controller 30 determines whether sufficient cooling has been performed. For example, the controller 30 may control one or more elements of the quantum computer 110 to perform one or more measurements to determine a temperature and/or motional mode of the atomic object disposed in the particular region 55. For example, the controller 30 may determine whether the S-to-P-to-D EIT cooling operation or clock state EIT cooling operation has been performed for a sufficient amount of time to cause sufficient cooling. For example, in an example embodiment, the controller 30 is configured to perform the S-to-P-to-D EIT cooling operation or clock state EIT cooling operation for a cooling time and the determination of whether sufficient cooling has been performed is a determination of whether the S-to-P-to-D EIT cooling operation or clock state EIT cooling operation has been performed for the cooling time. In various embodiments, the cooling time is selected from a range of 0.2 to 1.5 milliseconds.

In various embodiments, the S-to-P-to-D EIT cooling operation of various embodiments cools an atomic object 308 from the Doppler limit to $\bar{n} \approx 0.1$ in less than 1.5 milliseconds, where $\bar{n}$ is the average number of phonons in a particular mode of the atomic object. In various embodiments, the S-to-P-to-D EIT cooling operation of various embodiments cools an atomic object 308 from the Doppler limit to $\bar{n} \approx 0.1$ in 0.2 to 1.25 milliseconds. In an example embodiment, the S-to-P-to-D EIT cooling operation of various embodiments cools an atomic object 308 from the Doppler limit to $\bar{n} \approx 0.1$ in 0.2 to 0.5 milliseconds. For example, in an example embodiment, the S-to-P-to-D EIT cooling operation of various embodiments cools an atomic object 308 from the Doppler limit to $\bar{n} \approx 0.1$ in approximately 0.25 milliseconds. Thus, the controller 30 may determine whether a cooling time has passed since the first and second manipulation signals 215, 225 started to be applied to the particular region 55. In various embodiments, the cooling time is 0.25 milliseconds, 0.5 milliseconds, 1 millisecond, 1.25 milliseconds, 1.5 milliseconds, and/or the like.

In various embodiments, a clock state cooling operation of various embodiments, is configured to cool an atomic object 508 from the doppler limit to below $\bar{n} \approx 0.1$ in approximately 0.7 milliseconds for the axial gate mode and approximately 0.13 milliseconds for the axial center-of-mass mode. In various embodiments, a clock state cooling operation is configured to cool all of the radial modes below $\bar{n} \approx 1$ in less than 0.55 ms. Thus, the controller 30 may determine whether a cooling time has passed since the first and second manipulation signals 415, 425 started to be applied to the particular region 55. In various embodiments, the cooling time is 0.25 milliseconds, 0.55 milliseconds, 0.8 milliseconds, 1 millisecond, 1.25 milliseconds, and/or the like.

When it is determined that sufficient cooling has not been performed (e.g., the S-to-P-to-D EIT cooling operation or clock state EIT cooling operation has been performed for less than the cooling time), the process returns to step/operation 608 and the first and second manipulation signals 215, 225 continue to be applied to the particular region 55. When it is determined that sufficient cooling has been performed (e.g., the S-to-P-to-D EIT cooling operation or the clock state EIT cooling operation has been performed for the cooling time), the process continues to step/operation 612.

At step/operation 612, the controller 30 controls the first manipulation source 64A and the second manipulation source 64B to cause the first manipulation signal 215 and the second manipulation signal 225 to stop being applied to the particular region 55. For example, the controller 30 may cause the first manipulation source 64A and/or the second manipulation source 64B to stop generating the first manipulation signal 215 and/or the second manipulation signal 225, respectively. For example, the controller 30 may control one or more modulators to cause the first manipulation signal 215 and/or the second manipulation signal 225 to stop being provided and/or applied to the particular region 55.

At step/operation 614, the controller 30 controls various elements of the quantum computer 110 (e.g., voltage sources, manipulation sources 64, magnetic field generators 70, and/or the like) to continue performing and/or executing the quantum circuit. For example, the controller 30 may control various elements of the quantum computer 110 to cause one or more atomic objects to be transported into, out of, and/or within the particular region 55, perform one or more quantum gates on one or more atomic objects, read a state of one or more atomic objects and/or components of atomic objects, and/or the like.

Technical Advantages

In various embodiments, an S-to-P-to-D EIT cooling operation is performed. In various embodiments, a system (e.g., quantum computer) capable of performing an S-to-P-to-D EIT cooling and/or a controller that is configured to cause a corresponding system to perform an S-to-P-to-D EIT cooling operation is provided. For example, various embodiments provide systems where the first component of an atomic object has a low lying D manifold and the atomic object is cooled, at least in part, using an S-to-P-to-D EIT cooling operation. The S-to-P-to-D EIT cooling operation of various embodiments provides technical advantages to conventional laser cooling techniques and provides technical solutions to technical problems regarding conventional laser cooling techniques.

For example, Doppler cooling only enables cooling of atomic objects to the Doppler limit, which is not sufficiently low for a variety of applications (including QCCD-based quantum computing applications). Additionally, Doppler cooling is relatively slow compared to EIT cooling. The S-to-P-to-D EIT cooling operation of various embodiments enables efficient cooling of atomic objects well below the Doppler limit (e.g., $\bar{n} \approx 0.1$) with a cooling time in the range of 0.2 to 1.5 milliseconds. While resolved sideband cooling enables cooling below the Doppler limit, resolved sideband cooling is technically complex to implement, requires high laser power, and is sensitive fluctuations in the laser intensity. Resolved sideband cooling implementations are especially technically complex when atomic objects comprise multiple components and/or are crystals comprising multiple ions and/or atoms. The S-to-P-to-D EIT cooling operation of various embodiments provides improvements over resolved sideband cooling including less technical complexity to implement and lower laser power requirements while maintain fast and effective cooling performance. The S-to-P-to-D EIT cooling operation of various embodiments further avoids the complications in performing conventional EIT cooling for components of atomic objects having a low lying D manifold. For example, in conventional EIT cooling of atoms and/or ions having low lying D manifolds, there is a significant probability that atoms and/or ions become "stuck" in the low lying D manifold and will need to be repumped back to the cooling cycle between the S manifold and the P manifold. Thus, the S-to-P-to-D EIT cooling operation of various embodiments reduces the technical complexity compared to conventional EIT cooling, for atoms and/or ions with low lying D manifolds and/or atomic objects having first components with low lying D manifolds.

The S-to-P-to-D EIT cooling operation of various embodiments provides the additional technical advantage that the manipulation sources used to generate the first and second manipulation signals may be the same manipulation sources used to perform Doppler cooling. Thus, the system can be configured to perform Doppler cooling and S-to-P-to-D EIT cooling using the same two lasers, for example, which further reduces technical complexity of implementation in various embodiments.

In various embodiments, a clock state EIT cooling operation is performed. In various embodiments, a system (e.g., quantum computer) capable of performing a clock state EIT cooling and/or a controller that is configured to cause a corresponding system to perform a clock state EIT cooling operation is provided. For example, various embodiments provide systems where the first component of an atomic object has an energy structure similar to singly ionized Yb and the atomic object is cooled, at least in part, using a clock state EIT cooling operation. The clock state EIT cooling operation of various embodiments provides technical advantages to conventional laser cooling techniques and provides technical solutions to technical problems regarding conventional laser cooling techniques.

For example, as discussed elsewhere herein, laser cooling techniques are relatively slow processes (e.g., compared to other processes performed by a QCCD quantum processor such as quantum gates, atomic object transport, and/or the like). Moreover, conventional laser cooling techniques require significant laser power. Additionally, previous EIT cooling of ions having a $171Yb^+$-like energy structure (e.g., similar fine and/or hyperfine energy structure to a singly ionized 171Yb atom) worked by coupling multiple F=1 states to an excited manifold. For example, the $S_{1/2}$, F=1, m=+1 state of the ground manifold would be coupled to the $S_{1/2}$, F=1, m=0 state of the ground manifold via coupling to the $P_{1/2}$, F=0, m=0 state. However, the coupling of the $S_{1/2}$, F=1, m=+1 state to the $P_{1/2}$, F=0, m=0 state requires σ-polarization while the coupling of the $S_{1/2}$, F=1, m=0 state to the $P_{1/2}$, F=0, m=0 requires π-polarization, thereby requiring certain orientations of the magnetic field with respect to the propagation directions. Additionally, ions may become "stuck" in the $S_{1/2}$, F=0, m=0 state and must be repumped into the $S_{1/2}$, F=1 manifold, requiring an additional manipulation signal coupling the $S_{1/2}$, F=0 manifold to the P manifold. Thus, conventional EIT cooling requires a high degree of technical complexity to effectively cool an atomic object having a first component that has a $171Yb^+$-like energy structure. Moreover, resolved sideband cooling would require high-bandwidth control capabilities beyond those required for EIT, thereby requiring additional technical complexity if one wants to use both cooling methods. Thus, technical problems exist as to how to efficiently, effectively, and robustly cool atomic objects to near their motional ground state.

Various embodiments provide technical solutions to these technical problems. In various embodiments, an EIT cooling operation is performed using a first manipulation signal that couples a first clock state in the S manifold of the first component of the atomic object to one or more states of the P manifold and a second manipulation signal that couples the second clock state in the S manifold of the first component of the atomic object to the one or more states of the P manifold. The first clock state in the S manifold of the first component of the atomic object is the F=0, m=0 state and the second clock state in the S manifold of the first component of the atomic object is the F=1, m=0 state, in various embodiments. The first and second clock states are substantially less susceptible to environmental changes compared to the F=1, m=+/−1 states. In various embodiments, both the first manipulation signal and the second manipulation signal are detuned above the one or more states of the P manifold to establish a dark state associated with a two photon transition between the first clock state in the S manifold and the second clock state in the S manifold. By coupling the first and second clock states in the S manifold in order to produce a (selected) dark state, efficient cooling can be accomplished to near motional ground state of the atomic object (e.g., to temperatures significantly below the Doppler cooling limit) with lower laser power requirements than resolved sideband cooling and in a less technically complex manner than conventional EIT cooling. Moreover, in various embodiments, the first and second manipulation sources used to generate and/or provide the first and second manipulation signals may be used to also perform sideband cooling of the first component of the atomic object. Thus, various embodiments enable the use of both sideband cooling and EIT cooling without requiring additional lasers or other manipulation sources. Additionally, various embodiments result in faster cooling of atomic objects while using less power, compared to conventional laser cooling techniques. As such, various embodiments provide technical improvements over conventional laser cooling of atomic objects.

Exemplary Controller

In various embodiments, a quantum computer 110 comprises a controller 30 configured to control various elements of the quantum computer 110. In various embodiments, a controller 30 may be configured to cause a quantum computer 110 to perform various operations (e.g., computing operations such as gate operations, cooling operations, transport operations, qubit interaction operations, qubit measurement operations; leakage suppression/transformation operations; and/or the like). For example, the controller 30 may be configured to identify a cooling trigger, cause a cooling operation to be performed (e.g., an S-to-P-to-D EIT cooling operation, clock state EIT cooling operation, and/or Doppler cooling followed by an S-to-P-to-D or clock state EIT cooling operation), control first and/or second manipulation sources to provide first and/or second manipulation signals, and/or the like. For example, the controller 30 may be configured to control a cryogenic system and/or vacuum system controlling the temperature and pressure within the cryogenic and/or vacuum chamber 40, manipulation sources 64, voltage sources configured to apply voltage signals to electrodes of the atomic object confinement apparatus 50, magnetic field generators 70, and/or systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the atomic object confinement apparatus 50.

As shown in FIG. 7, in various embodiments, the controller 30 may comprise various controller elements including processing elements 705, memory 710, driver controller elements 715, a communication interface 720, analog-digital converter elements 725, and/or the like. For example, the processing elements 705 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 705 of the controller 30 comprises a clock and/or is in communication with a clock.

For example, the memory 710 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 710 may store qubit records corresponding to the qubits of the quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 710 (e.g., by a processing element 705) causes the controller 30 to perform one or more steps, operations, processes, procedures and/or the like described herein.

In various embodiments, the driver controller elements 715 may include one or more drivers and/or controller elements each configured to control one or more drivers. In various embodiments, the driver controller elements 715 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 505). In various embodiments, the driver controller elements 715 may enable the controller 30 to operate and/or control one or more manipulation sources 64, control one or more magnetic field generators 70, operate vacuum and/or cryogenic systems, and/or the like. In various embodiments, the drivers may be laser drivers; vacuum component drivers; voltage sources (e.g., AC voltage sources, arbitrary waveform generators (AWG), direct digital synthesizers (DDS), and/or the like); cryogenic and/or vacuum system component drivers; and/or the like. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements 725 configured to receive signals from one or more optical receiver components, calibration sensors, and/or the like. For example, the controller 30 may receive measurements corresponding to conditions in particular regions 55 of the atomic object confinement apparatus 50 and/or corresponding to various atomic objects 308 via the analog-digital converter elements 725.

In various embodiments, the controller 30 may comprise a communication interface 720 for interfacing and/or communicating with a computing entity 10. For example, the controller 30 may comprise a communication interface 720 for receiving executable instructions, command sets, and/or the like from the computing entity 10 and providing output received from the quantum computer 110 (e.g., from an optical collection system or other measurement system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 8 provides an illustrative schematic representative of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110. For example, a user may operate a computing entity 10 to generate and/or program a quantum algorithm and/or quantum circuit that may be provided such that the controller 30 may receive the quantum algorithm and/or quantum circuit and cause the quantum computer 110 to perform the quantum algorithm and/or quantum circuit.

As shown in FIG. 8, a computing entity 10 can include an antenna 812, a transmitter 814 (e.g., radio), a receiver 806 (e.g., radio), and a processing device and/or element 808 that provides signals to and receives signals from the transmitter 814 and receiver 806, respectively. The signals provided to and received from the transmitter 814 and the receiver 806, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 816 and/or speaker/speaker driver coupled to a processing device and/or element 808 and a touch screen, keyboard, mouse, and/or microphone coupled to a processing device and/or element 808). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 818 (hard or soft), a touch display, voice/speech or motion interfaces, scanners, readers, or other input device. In embodiments including a keypad 818, the keypad 818 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 822 and/or non-volatile storage or memory 824, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for cooling an atomic object confined by an atomic object confinement apparatus, the method comprising:
    controlling, by a controller associated with the atomic object confinement apparatus, a first manipulation source to provide a first manipulation signal to a particular region of the atomic object confinement apparatus; and
    controlling, by the controller, a second manipulation source to provide a second manipulation signal to the particular region of the atomic object confinement apparatus,
    wherein:
        the atomic object to be cooled is located in the particular region of the atomic object confinement apparatus,
        the first manipulation signal is characterized by a first wavelength corresponding to a transition between an S manifold and a P manifold of a first component of the atomic object and detuned from the transition between the S manifold and the P manifold by a first detuning,
        the second manipulation signal is characterized by a second wavelength corresponding to a transition between the P manifold and a D manifold of the first component of the atomic object and detuned from the transition between P manifold and the D manifold by a second detuning, and
        the first detuning and the second detuning are selected to establish a dark state associated with a two photon transition between the S manifold and the D manifold.

2. The method of claim 1, wherein the atomic object is an ion crystal comprising two or more ions and the first component of the atomic object is at least one of the two or more ions of a first atomic object type.

3. The method of claim 2, wherein the first component of the atomic object is configured for use as a coolant ion in a sympathetic cooling scheme for the ion crystal.

4. The method of claim 2, wherein a second component of the atomic object is at least one of the two or more ions of a second atomic object type, the second atomic object type being different from the first atomic object type, and wherein the at least one of the two or more ions of the second atomic object type is configured for use as a qubit of a quantum computer comprising the atomic object confinement apparatus.

5. The method of claim 1, wherein the first detuning and the second detuning are substantially equal.

6. The method of claim 1, wherein a polarization of the first manipulation signal and a polarization of the second manipulation signal correspond to the two photon transition associated with the dark state.

7. The method of claim 1, further comprising causing generation of a magnetic field having a magnetic field direction in the particular region of the atomic object confinement apparatus, wherein one of the atomic object or the particular region of the atomic object confinement apparatus defines an atomic object axis, and the magnetic field direction is transverse to the atomic object axis.

8. The method of claim 7, wherein the magnetic field direction and the atomic object axis form an angle in a range of thirty to sixty degrees.

9. The method of claim 7, wherein the first manipulation signal defines a first propagation direction which is transverse to the atomic object axis and the second manipulation signal defines a second propagation direction which is transverse to the atomic object axis.

10. The method of claim 9, wherein the first manipulation signal and the second manipulation signal are not co-propagating and the magnetic field direction is transverse to both the first propagation direction and the second propagation direction.

11. The method of claim 10, wherein both the first propagation direction and the second propagation direction are substantially perpendicular to the magnetic field direction.

12. The method of claim 9, wherein (a) the polarization of the first manipulation signal is substantially transverse to a plane defined by the atomic object confinement apparatus, (b) the polarization of the second manipulation signal is substantially transverse to the plane defined by the atomic object confinement apparatus, and (c) the first propagation direction, the second propagation direction, and the magnetic field direction are respectively substantially parallel to the plane defined by the atomic object confinement apparatus.

13. An apparatus comprising at least one processor and memory storing computer-executable instructions, the computer-executable instructions configured to, when executed by the at least one processor, cause the apparatus to at least:
control a first manipulation source to provide a first manipulation signal to a particular region of an atomic object confinement apparatus; and
control a second manipulation source to provide a second manipulation signal to the particular region of the atomic object confinement apparatus,
wherein:
an atomic object is located within the particular region of the atomic object confinement apparatus,
the first manipulation signal and the second manipulation signal are configured to collectively cool the atomic object,
the first manipulation signal is characterized by a first wavelength corresponding to a transition between an S manifold and a P manifold of a first component of the atomic object and detuned from the transition between the S manifold and the P manifold by a first detuning,
the second manipulation signal is characterized by a second wavelength corresponding to a transition between the P manifold and a D manifold of the first component of the atomic object and detuned from the transition between P manifold and the D manifold by a second detuning, and
the first detuning and the second detuning are selected to establish a dark state associated with a two photon transition between the S manifold and the D manifold.

14. The apparatus of claim 13, wherein (a) the apparatus is a controller of a quantum computer comprising the atomic object confinement apparatus, (b) the atomic object is an ion crystal comprising two or more ions and the first component of the atomic object is at least one of the two or more ions of a first atomic object type, and (c) the first component of the atomic object is configured for use as a coolant ion in a sympathetic cooling scheme for the ion crystal.

15. The apparatus of claim 14, wherein a second component of the atomic object is at least one of the two or more ions of a second atomic object type, the second atomic object type being different from the first atomic object type, and wherein the at least one of the two or more ions of the second atomic object type is configured for use as a qubit of the quantum computer.

16. The apparatus of claim 13, wherein a polarization of the first manipulation signal and a polarization of the second manipulation signal correspond to the two photon transition associated with the dark state.

17. The apparatus of claim 13, wherein the computer-executable instructions are further configured to, when executed by the at least one processor, cause the apparatus to at least cause generation of a magnetic field having a magnetic field direction in the particular region of the atomic object confinement apparatus, wherein one of the atomic object or the particular region of the atomic object confinement apparatus defines an atomic object axis, and the magnetic field direction is transverse to the atomic object axis.

18. The apparatus of claim 17, wherein the first manipulation signal defines a first propagation direction which is transverse to the atomic object axis and the second manipulation signal defines a second propagation direction which is transverse to the atomic object axis.

19. The apparatus of claim 18, wherein the first manipulation signal and the second manipulation signal are not copropagating and the magnetic field direction is transverse to both the first propagation direction and the second propagation direction.

20. A system comprising:
an atomic object confinement apparatus configured to confine an atomic object in a particular region of the atomic object confinement apparatus;
a first manipulation source controllable by a controller of the system and configured to provide a first manipulation signal to the particular region of the atomic object confinement apparatus;
a second manipulation source controllable by the controller of the system and configured to provide a second manipulation signal to the particular region of the atomic object confinement apparatus; and
the controller comprising at least one processor and memory storing computer-executable instructions, the computer-executable instructions configured to, when executed by the at least one processor, cause the controller to at least:
control the first manipulation source to provide the first manipulation signal to the particular region of the atomic object confinement apparatus; and
control the second manipulation source to provide the second manipulation signal to the particular region of the atomic object confinement apparatus,
wherein:
the first manipulation signal and the second manipulation signal are configured to collectively cool the atomic object,
the first manipulation signal is characterized by a first wavelength corresponding to a transition between an S manifold and a P manifold of a first component of the atomic object and detuned from the transition between the S manifold and the P manifold by a first detuning,
the second manipulation signal is characterized by a second wavelength corresponding to a transition between the P manifold and a D manifold of the first component of the atomic object and detuned from the transition between P manifold and the D manifold by a second detuning, and the first detuning and the second detuning are selected to establish a dark state associated with a two photon transition between the S manifold and the D manifold.

\* \* \* \* \*